United States Patent
Linsmeier et al.

(10) Patent No.: US 11,958,449 B2
(45) Date of Patent: *Apr. 16, 2024

(54) FIRE APPARATUS LEVEL INDICATION SYSTEM

(71) Applicant: Oshkosh Corporation, Oshkosh, WI (US)

(72) Inventors: Eric R. Linsmeier, Larsen, WI (US); David W. Archer, Hortonville, WI (US)

(73) Assignee: Oshkosh Corporation, Oshkosh, WI (US)

( * ) Notice: Subject to any disclaimer, the term of this patent is extended or adjusted under 35 U.S.C. 154(b) by 212 days.

This patent is subject to a terminal disclaimer.

(21) Appl. No.: 17/498,069

(22) Filed: Oct. 11, 2021

(65) Prior Publication Data

US 2022/0024425 A1    Jan. 27, 2022

Related U.S. Application Data

(63) Continuation of application No. 16/534,508, filed on Aug. 7, 2019, now Pat. No. 11,167,734, which is a
(Continued)

(51) Int. Cl.
*B60S 9/10* (2006.01)
*B66F 17/00* (2006.01)
(Continued)

(52) U.S. Cl.
CPC .............. *B60S 9/10* (2013.01); *B66F 17/006* (2013.01); *E06C 5/04* (2013.01); *E06C 5/38* (2013.01); *B60Y 2300/30* (2013.01)

(58) Field of Classification Search
CPC .. B60S 9/10; B66F 17/006; E06C 5/04; E06C 5/38; B60Y 2300/30
See application file for complete search history.

(56) References Cited

U.S. PATENT DOCUMENTS

| 5,538,274 A | 7/1996 | Schmitz et al. |
| 5,580,095 A * | 12/1996 | Fukumoto ............... B66C 23/80 |
| | | 280/DIG. 1 |

(Continued)

FOREIGN PATENT DOCUMENTS

| CA | 2121181 | 3/1999 |
| CN | 201253439 Y | 6/2009 |

(Continued)

OTHER PUBLICATIONS

Notification of Transmittal of the International Search Report and the Written Opinion of the International Searching Authority, or the Declaration, dated Aug. 13, 2018, 21 pages.

*Primary Examiner* — Peter D Nolan
*Assistant Examiner* — Wae L Louie
(74) *Attorney, Agent, or Firm* — Foley & Lardner LLP

(57) ABSTRACT

A level indication system for a vehicle includes a control system. The control system is configured to acquire stability data regarding a stability characteristic of the vehicle at a current location, determine whether the stability characteristic is within an operational range, provide a first indication that the vehicle is reconfigurable at the current location into an operable state in response to determining that the stability characteristic is within the operational range, and provide a second indication that the vehicle is not reconfigurable at the current location into the operable state in response to determining that the stability characteristic is within a nonoperational range.

20 Claims, 21 Drawing Sheets

Related U.S. Application Data continuation of application No. 15/880,241, filed on Jan. 25, 2018, now Pat. No. 10,414,385.

(60) Provisional application No. 62/451,604, filed on Jan. 27, 2017.

(51) Int. Cl.
    *E06C 5/04*         (2006.01)
    *E06C 5/38*         (2006.01)

(56) References Cited

U.S. PATENT DOCUMENTS

| | | | |
|---|---|---|---|
| 5,820,150 A | 10/1998 | Archer et al. | |
| 5,897,123 A * | 4/1999 | Cherney | B60P 3/16 |
| | | | 180/209 |
| 6,561,718 B1 | 5/2003 | Archer et al. | |
| 6,860,332 B1 | 3/2005 | Archer et al. | |
| 6,882,917 B2 | 4/2005 | Pillar et al. | |
| 6,883,815 B2 | 4/2005 | Archer | |
| 6,976,688 B2 | 12/2005 | Archer et al. | |
| 7,006,902 B2 | 2/2006 | Archer et al. | |
| 7,055,880 B2 | 6/2006 | Archer | |
| 7,387,348 B2 | 6/2008 | Archer et al. | |
| 7,389,826 B2 | 6/2008 | Linsmeier et al. | |
| 7,392,122 B2 | 6/2008 | Pillar et al. | |
| 7,451,028 B2 | 11/2008 | Pillar et al. | |
| 7,756,621 B2 | 7/2010 | Pillar et al. | |
| 8,201,656 B2 | 6/2012 | Archer et al. | |
| 8,333,390 B2 | 12/2012 | Linsmeier et al. | |
| 8,839,902 B1 | 9/2014 | Archer et al. | |
| 9,061,169 B2 | 6/2015 | Linsmeier | |
| 9,492,695 B2 | 11/2016 | Betz et al. | |
| 9,580,962 B2 | 2/2017 | Betz et al. | |
| 10,414,385 B2 * | 9/2019 | Linsmeier | E06C 5/38 |
| 2001/0030402 A1 * | 10/2001 | White | B60B 25/02 |
| | | | 280/47.25 |
| 2004/0002794 A1 * | 1/2004 | Pillar | B65F 3/045 |
| | | | 701/1 |
| 2006/0021764 A1 | 2/2006 | Archer et al. | |
| 2006/0032701 A1 | 2/2006 | Linsmeier et al. | |
| 2006/0032702 A1 | 2/2006 | Linsmeier et al. | |
| 2006/0086566 A1 | 4/2006 | Linsmeier et al. | |
| 2007/0158920 A1 | 7/2007 | Delaney | |
| 2007/0294014 A1 | 12/2007 | Green et al. | |
| 2008/0114513 A1 * | 5/2008 | Pillar | G08G 1/20 |
| | | | 701/41 |
| 2009/0033044 A1 * | 2/2009 | Linsmeier | B60G 17/018 |
| | | | 280/5.514 |
| 2016/0304051 A1 | 10/2016 | Archer et al. | |
| 2017/0158920 A1 | 6/2017 | Arai et al. | |
| 2018/0215354 A1 * | 8/2018 | Linsmeier | E06C 5/38 |

FOREIGN PATENT DOCUMENTS

| | | |
|---|---|---|
| CN | 101559759 | 10/2009 |
| CN | 101619985 | 1/2010 |
| CN | 102303570 | 1/2012 |
| CN | 102514551 | 6/2012 |
| CN | 104784850 | 7/2015 |
| CN | 107106883 | 8/2017 |
| CN | 107206262 | 9/2017 |
| EP | 0 706 904 | 4/1996 |
| EP | 0 921 092 | 6/1999 |
| EP | 1 536 098 A1 | 6/2005 |
| EP | 1 781 383 | 5/2007 |
| EP | 1 371 391 B | 12/2009 |
| EP | 1 371 392 | 9/2010 |
| EP | 2 722 302 A1 | 4/2014 |
| GB | 2 277 304 | 2/1997 |
| GB | D 300 9436 | 3/2003 |
| GB | 2 365 829 | 9/2004 |
| GB | 2 400 588 A | 1/2005 |
| GB | 2 400 589 A | 2/2005 |
| GB | 2 400 590 A | 3/2005 |
| WO | WO-2006/015242 | 2/2006 |
| WO | WO-2006/015272 | 2/2006 |
| WO | WO-2006/037100 | 4/2006 |
| WO | WO-2006/096202 | 9/2006 |
| WO | WO-2006/101865 | 9/2006 |
| WO | WO-2009/046246 | 4/2009 |
| WO | WO-2014/138801 A1 | 9/2014 |
| WO | WO-2016/085652 | 6/2016 |
| WO | WO-2016/085653 | 6/2016 |
| WO | WO-2006/086614 | 8/2016 |
| WO | WO-2016/171965 | 10/2016 |

* cited by examiner

FIRE APPARATUS LEVEL INDICATION SYSTEM

CROSS-REFERENCE TO RELATED PATENT APPLICATIONS

This application is a continuation of U.S. application Ser. No. 16/534,508, filed Aug. 7, 2019, which is a continuation of U.S. application Ser. No. 15/880,241, filed Jan. 25, 2018, which claims the benefit of U.S. Provisional Patent Application No. 62/451,604, filed Jan. 27, 2017, all of which are incorporated herein by reference in their entireties.

BACKGROUND

A fire apparatus may be used to contain and extinguish fires. Such a fire apparatus may require that the fire apparatus be level or substantially stable to during operation thereof.

SUMMARY

One embodiment relates to a level indication system for a vehicle. The level indication system includes a control system. The control system is configured to determine whether a stability characteristic of the vehicle at a current location is within an operational range or a nonoperational range. The stability characteristic includes at least one of a slope, a grade, or a jackknife angle of the vehicle. The control system is configured to provide (i) a first indication that the vehicle is reconfigurable at the current location into a state whereby the vehicle is operable at the current location in response to determining that the stability characteristic is within the operational range or (ii) a second indication that the vehicle is not operable at the current location in response to determining that the stability characteristic is within the nonoperational range. The control system is configured to facilitate engaging a stabilization system of the vehicle in response to the stability characteristic being within the operational range and thereby reconfiguring the vehicle into a state whereby the vehicle is operable at the current location.

Another embodiment relates to a level indication system for a vehicle. The level indication system includes a control system. The control system is configured to acquire stability data regarding at least one of a slope, a grade, or a jackknife angle of the vehicle at a current location, determine whether the at least one of the slope, the grade, or the jackknife angle is within an operational slope range, an operational grade range, or an operational jackknife angle range, respectively, provide a first indication that the vehicle is reconfigurable at the current location into an operable state in response to determining that the at least one of the slope, the grade, or the jackknife angle is within the operational slope range, the operational grade range, or the operational jackknife angle range, respectively, and provide a second indication that the vehicle is not reconfigurable at the current location into the operable state in response to determining that the at least one of the slope, the grade, or the jackknife angle is within a nonoperational slope range, a nonoperational grade range, or a nonoperational jackknife angle range, respectively.

Still another embodiment relates to a level indication system for a vehicle. The level indication system includes a control system. The control system is configured to acquire stability data regarding a stability characteristic of the vehicle at a current location, determine whether the stability characteristic is within an operational range, provide a first indication that the vehicle is reconfigurable at the current location into an operable state in response to determining that the stability characteristic is within the operational range, and provide a second indication that the vehicle is not reconfigurable at the current location into the operable state in response to determining that the stability characteristic is within a nonoperational range.

The invention is capable of other embodiments and of being carried out in various ways. Alternative exemplary embodiments relate to other features and combinations of features as may be generally recited in the claims.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1A:
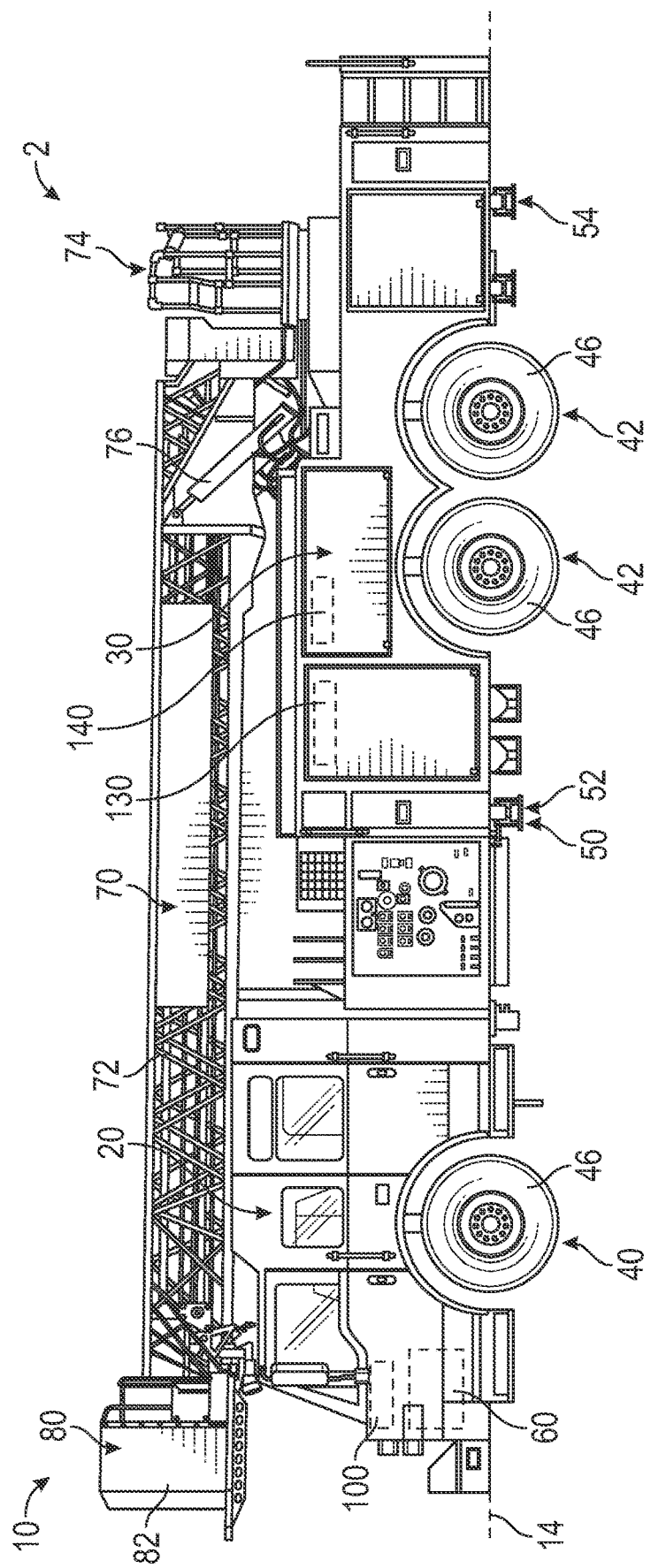
FIG. 1A is a side view of a tandem fire apparatus, according to an exemplary embodiment.

Before turning to the figures, which illustrate the exemplary embodiments in detail, it should be understood that the present application is not limited to the details or methodology set forth in the description or illustrated in the figures.

It should also be understood that the terminology is for the purpose of description only and should not be regarded as limiting.

According to an exemplary embodiment, a level indication system for a vehicle (e.g., a fire apparatus, etc.) is configured to indicate whether a stabilization system (e.g., outriggers, downriggers, stability feet, etc.) of the vehicle may be activated to reconfigure the vehicle such that the vehicle is operable on uneven ground. By way of example, the vehicle may include a sensor system configured to acquire stability data regarding a grade, a slope, and/or a jackknife angle of the vehicle. According to an exemplary embodiment, the level indication system is configured to compare the stability data to various thresholds and/or operation ranges for the vehicle to determine whether the vehicle is reconfigurable to facilitate operating the vehicle at its current location and/or in its current orientation. The level indication may thereafter provide an indication of the determination to a display for an operator to view and interpret. Traditionally, level systems for vehicles may include bubble levels that require cumbersome manual use and operation. The level indication system of the present disclosure may advantageously be relatively more accurate, quicker, and easier to use relative to bubble level systems.

According to the exemplary embodiment shown in FIGS. 1A-5, a vehicle, shown as a fire apparatus 10, includes a control system, shown as level indication and control system 100, configured to facilitate determining stability of, operational capability of, and/or controlling the fire apparatus 10 based at least partially on a grade, a slope, and/or a jackknife angle of the fire apparatus 10. As shown in FIGS. 1A-4E, the fire apparatus 10 includes a cab assembly, shown as front cabin 20, and a body assembly, shown as rear section 30, defining a longitudinal axis 14 and a lateral axis 16. In one embodiment, the longitudinal axis 14 extends along a direction defined by a chassis (e.g., frame, etc.) of the fire apparatus 10 (e.g., front-to-back, etc.). As shown in FIGS. 1A-4E, the front cabin 20 is positioned forward of the rear section 30 (e.g., with respect to a forward direction of travel for the fire apparatus 10 along the longitudinal axis 14, etc.). According to an alternative embodiment, the cab assembly may be positioned behind the body assembly (e.g., with respect to a forward direction of travel for the fire apparatus 10 along the longitudinal axis 14, etc.). The cab assembly may be positioned behind the body assembly on, by way of example, a rear tiller fire apparatus.

Figure 1B:
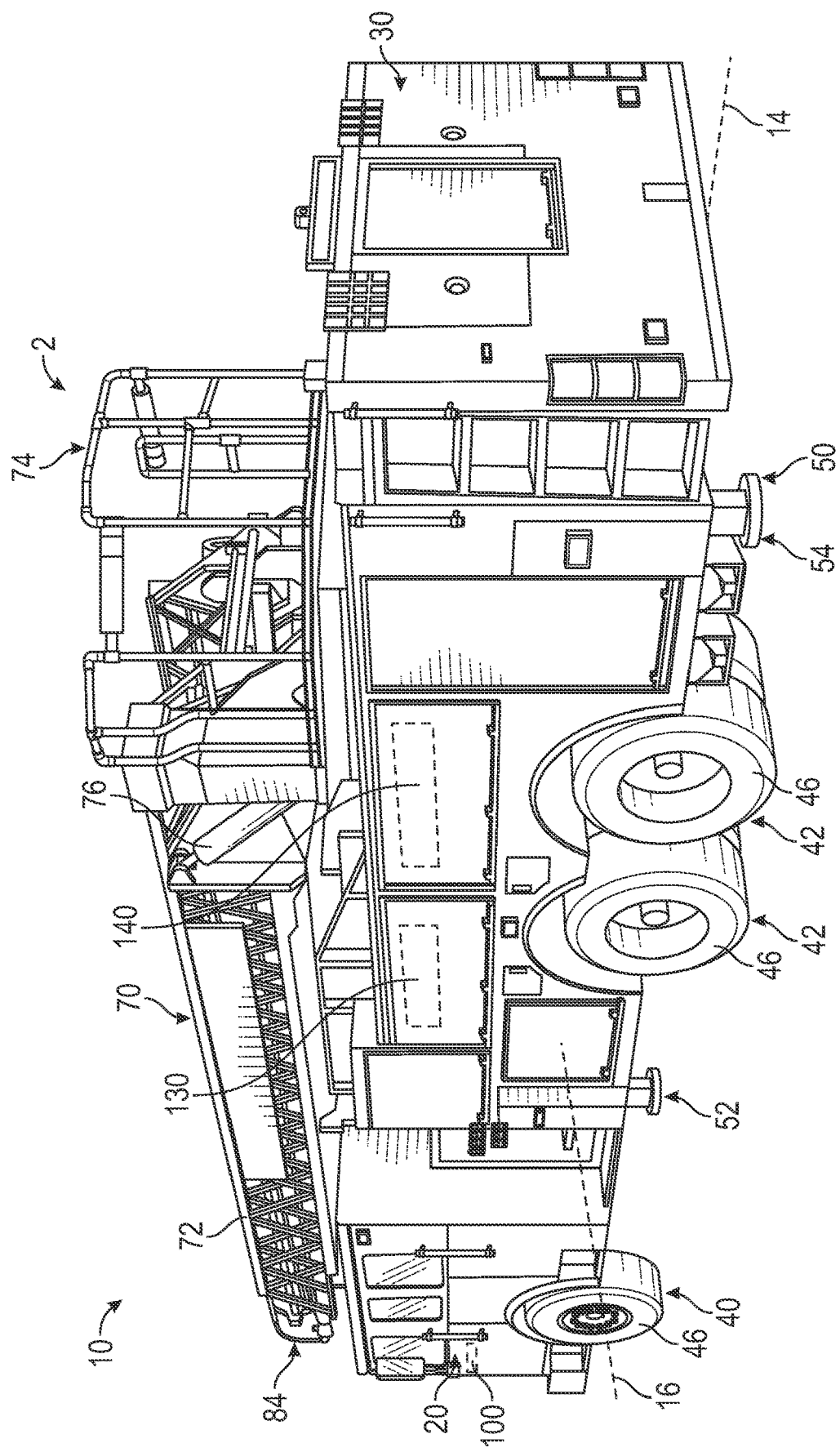
FIG. 1B is a rear perspective view of the tandem rear axle fire apparatus of FIG. 1A, according to an exemplary embodiment.
Figure 2:
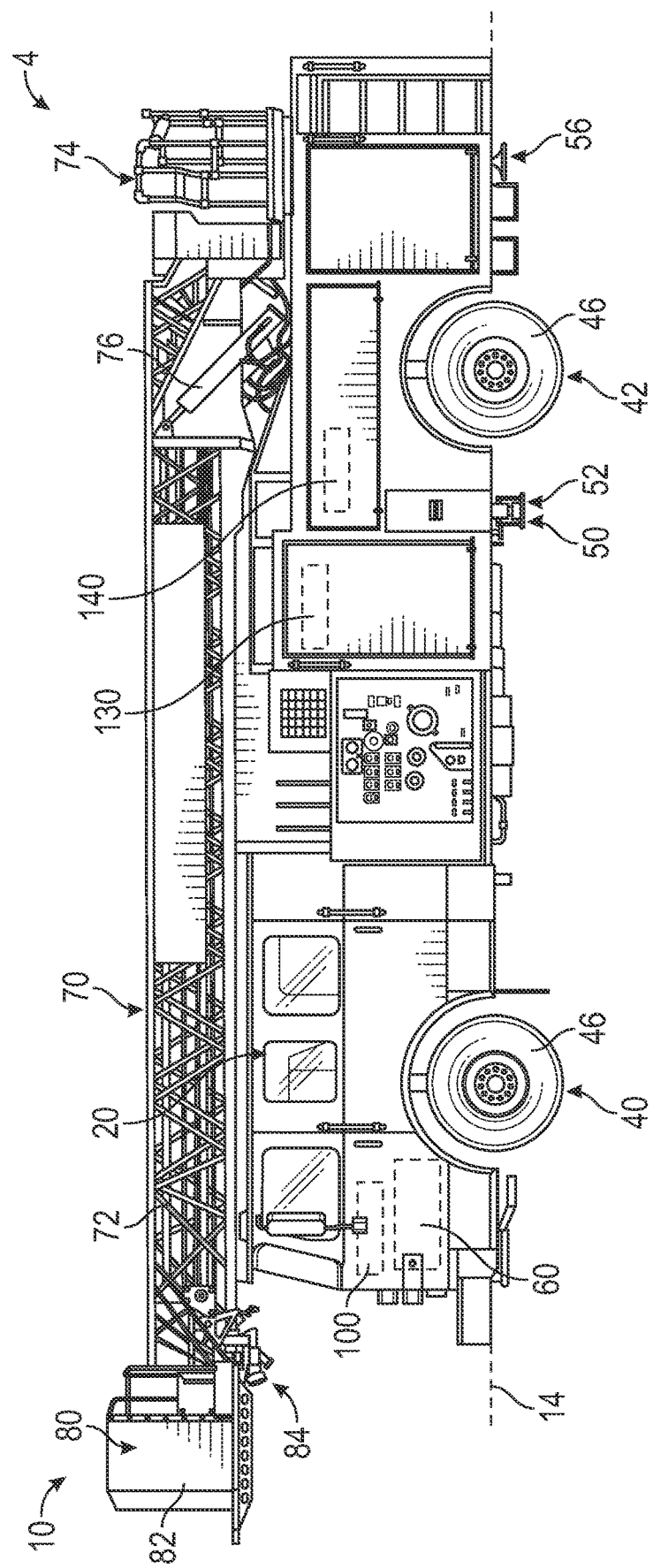
FIG. 2 is a side view of a single rear axle fire apparatus, according to an exemplary embodiment.
Figure 3:
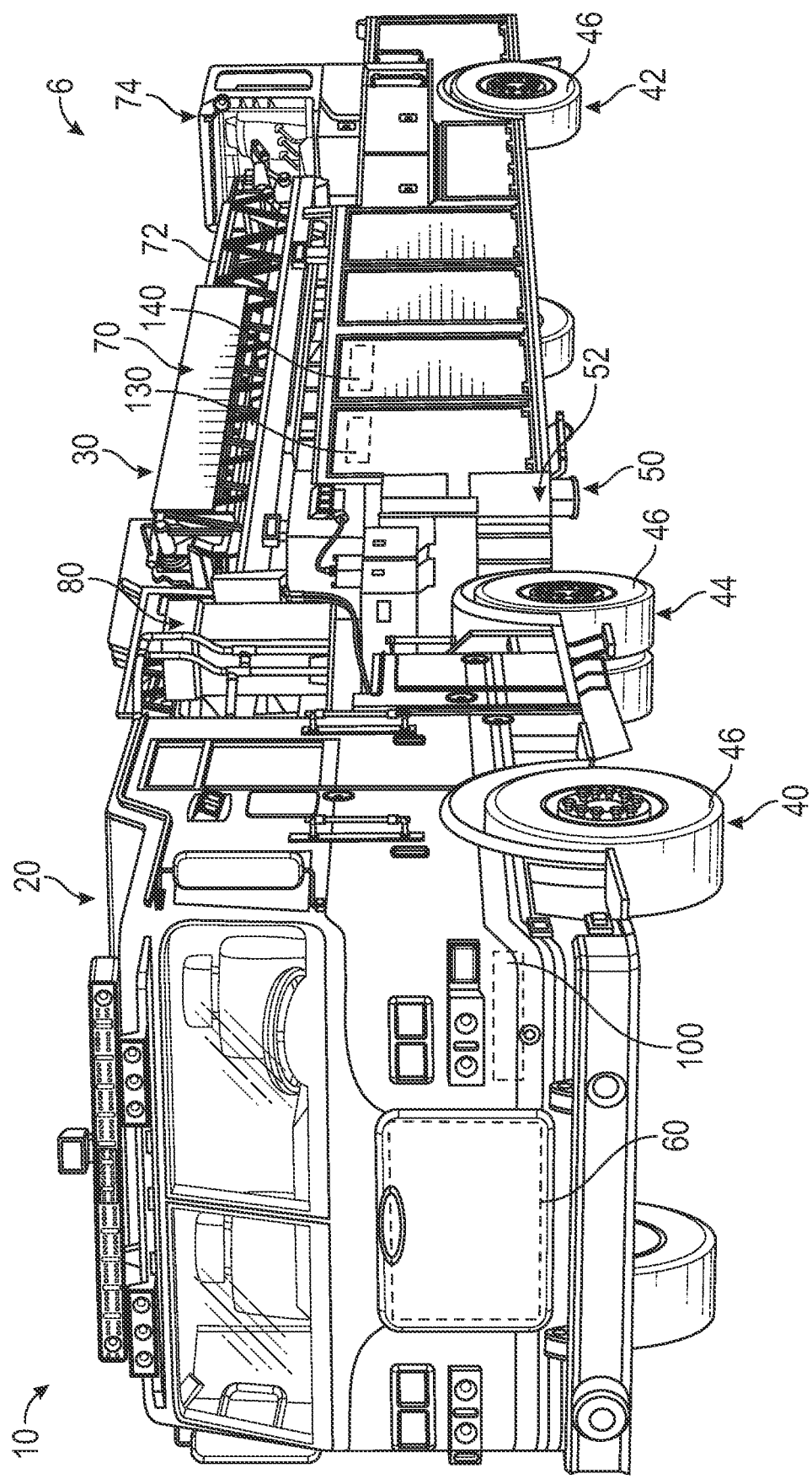
FIG. 3 is a front perspective side view of a tiller fire apparatus, according to an exemplary embodiment.

As shown in FIGS. 1A and 1B, the fire apparatus 10 is configured as a first fire apparatus, shown as tandem rear axle fire apparatus 2. The tandem rear axle fire apparatus 2 includes a first axle, shown as front axle 40, positioned along the front cabin 20 and a pair of second axles, shown as rear axles 42, positioned along the rear section 30. As shown in FIG. 2, the fire apparatus 10 is configured as a second fire apparatus, shown as single rear axle fire apparatus 4. The single rear axle fire apparatus 4 has a front axle 40 positioned along the front cabin 20 and a single rear axle 42 positioned along the rear section 30. As shown in FIG. 3, the fire apparatus 10 is configured as a third fire apparatus, shown as tiller fire apparatus 6. The tiller fire apparatus 6 has a front axle 40 positioned along the front cabin 20, a rear axle 42 positioned along the rear section 30, and a third axle, shown as intermediate axle 44, positioned along the front cabin 20 between the front axle 40 and the rear axle 42. In some embodiments, the tiller fire apparatus 6 includes a pair of rear axles 42. According to an exemplary embodiment, the rear section 30 of the tiller fire apparatus 6 is pivotally coupled to the front cabin 20 (e.g., similar to a trailer, etc.).

In other embodiments, the fires apparatus 10 is configured as another type of fire apparatus (e.g., a mid-mount fire apparatus with the turntable 74 coupled to the front of the rear section 30 just to the rear of the front cab 20, etc.). As shown in FIGS. 1A-3, the front axle 40, the rear axle(s) 42, and the intermediate axle 44 of the fire apparatus 10 (e.g., the tandem rear axle fire apparatus 2, the single rear axle fire apparatus 4, the tiller fire apparatus 6, etc.) include tractive assemblies, shown as wheel and tire assemblies 46. In other embodiments, the fire apparatus 10 includes another type of tractive element (e.g., a track, etc.). In some embodiments, the fire apparatus 10 is configured as another type of fire apparatus (e.g., an aircraft rescue and firefighting ("ARFF") truck, etc.). In alternative embodiments, the vehicle is configured as a vehicle other than a fire apparatus. By way of example, the vehicle may be a military ground vehicle, an off-road vehicle (e.g., a utility task vehicle, a recreational off-highway vehicle, an all-terrain vehicle, a sport utility vehicle, mining equipment, construction equipment, farming equipment, etc.), an aerial truck, a rescue truck, a concrete mixer truck, a refuse truck, a commercial truck, a tanker, an ambulance, a boom lift, and/or still another vehicle (e.g., any type of vehicle that may include outriggers, downriggers, stabilization feet, etc.).

As shown in FIGS. 1A-3, 4D, and 4E, the fire apparatus 10 includes a stabilization system, shown as stabilization system 50. As shown in FIGS. 1A and 1, the stabilization system 50 of the tandem rear axle fire apparatus 2 includes a first stabilizer, shown as outriggers 52, positioned along the rear section 30 between the front axle 40 and the rear axles 42, and a second stabilizer, shown as downriggers 54, positioned along the rear section 30 rearward of the rear axles 42. In some embodiments, the downriggers 54 of the tandem rear axle fire apparatus 2 are replaced with a stability foot. As shown in FIG. 2, the stabilization system 50 of the single rear axle fire apparatus 4 includes the outriggers 52 positioned along the rear section 30 between the front axle 40 and the rear axle 42 and a third stabilizer, shown as stability foot 56, positioned along the rear section 30 rearward of the rear axle 42. In some embodiments, the stability foot 56 of the single rear axle fire apparatus 4 is replaced with the downriggers 54. As shown in FIG. 3, the stabilization system 50 of the tiller fire apparatus 6 includes the outriggers 52 positioned along the rear section 30 between the intermediate axle 44 and the rear axle 42. In some embodiments, the tiller fire apparatus 6 additionally includes at least one of the downriggers 54 and the stability foot 56. In some embodiments, the fire apparatus 10 (e.g., the tandem rear axle fire apparatus 2, the single rear axle fire apparatus 4, the tiller fire apparatus 6, a mid-mount fire apparatus, etc.) additionally or alternatively includes the outriggers 52, the downriggers 54, and/or the stability foot 56 positioned along the front cabin 20 (e.g., forward of the front axle 40, rearward of the front axle 40, etc.). By way of example, the stabilization system 50 may additionally or alternatively include the downriggers 54 positioned at and/or coupled to the front cabin 20 (e.g., coupled to a front bumper of the front cabin 20, coupled to the frame underneath the front cabin 20, etc.). In other embodiments, the stabilization system 50 includes any combination of front outriggers, rear outriggers, front down riggers, rear downriggers, front stability feet, and/or rear stability feet variously positioned along the fire apparatus 10.

Figure 4A:
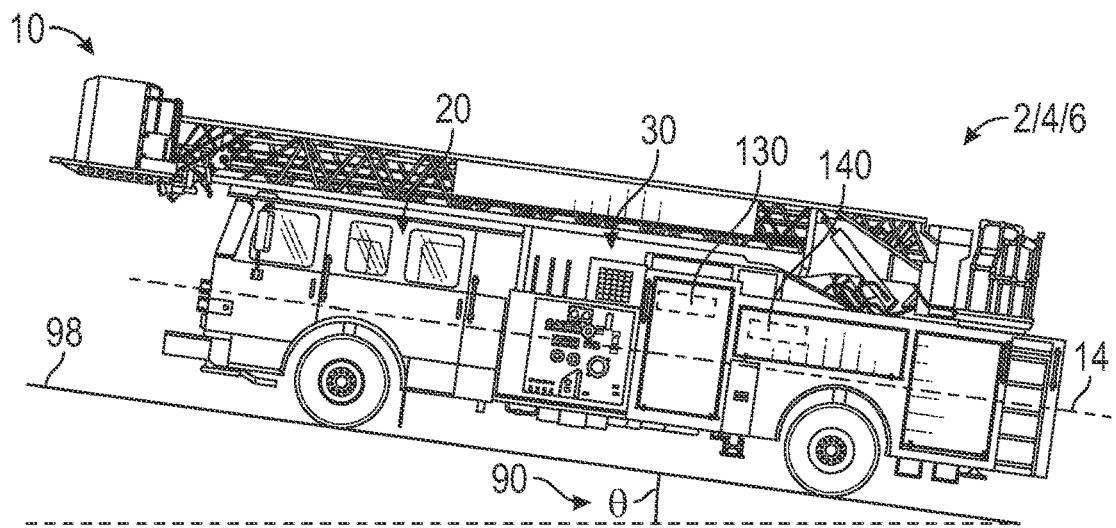
FIGS. 4A-4E are various views of a grade, a slope, and/or a jackknife angle of a fire apparatus, according to an exemplary embodiment.
Figure 4B:
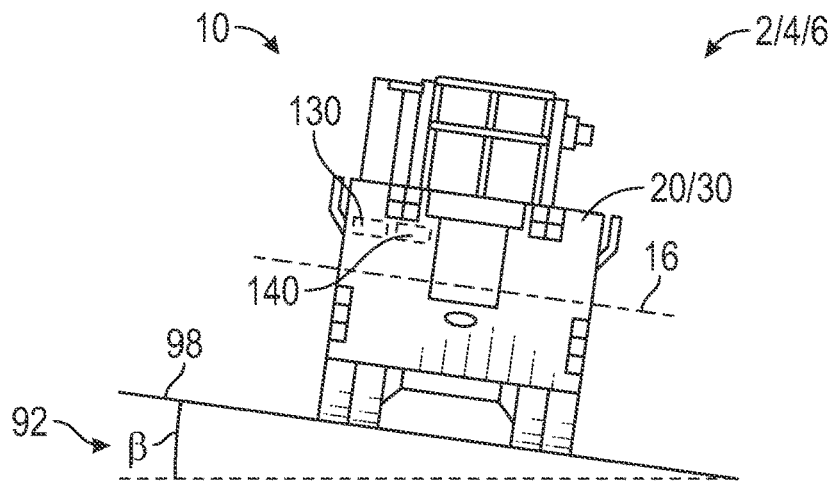
Figure 4C:
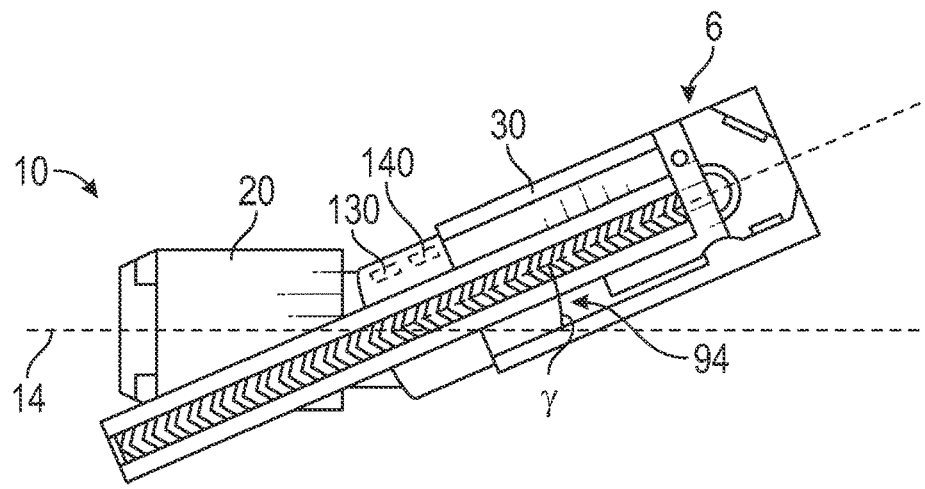
Figure 4D:
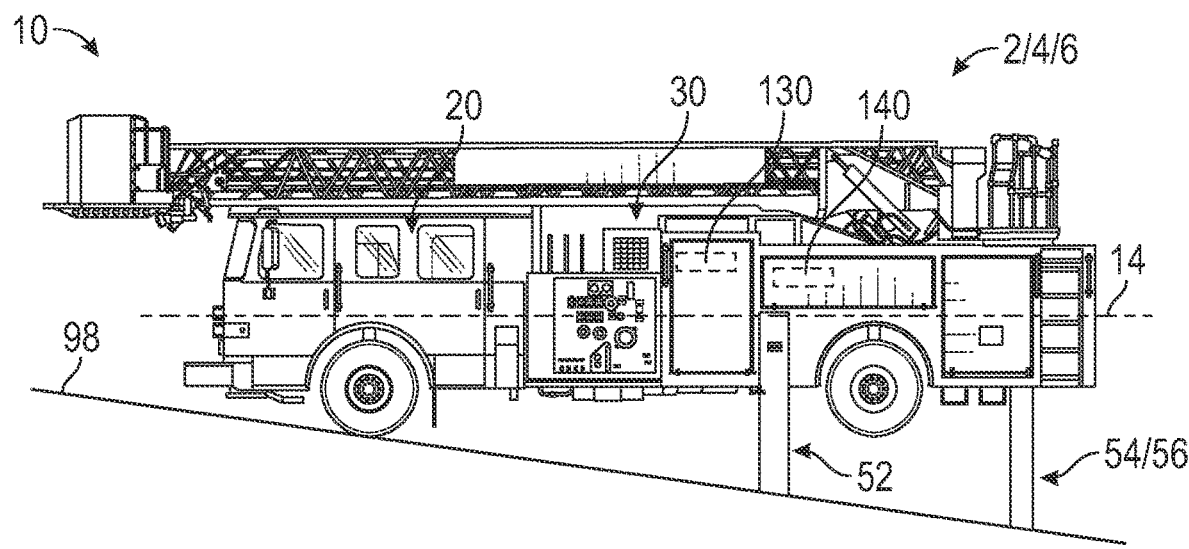
Figure 4E:
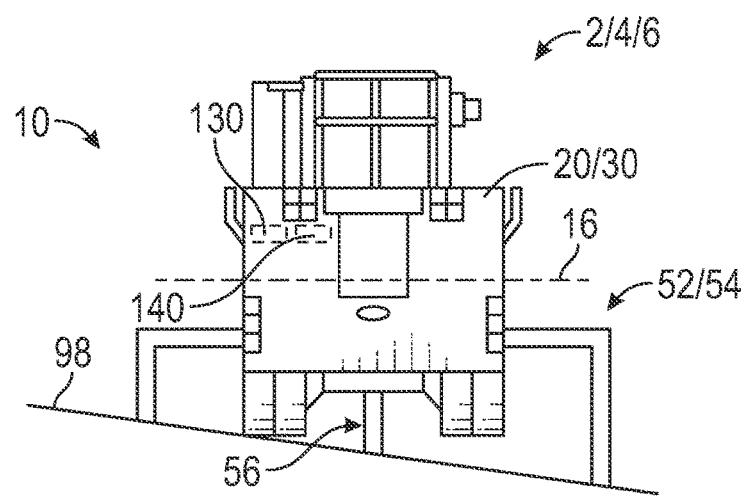

According to the exemplary embodiment shown in FIGS. 4D and 4E, the outriggers 52 are moveably coupled to the fire apparatus 10. The outriggers 52 may extend outward from each lateral side of the fire apparatus 10, away from the longitudinal axis 14, and parallel to the lateral axis 16. In some embodiments, the outriggers 52 extend to a maximum distance of up to eighteen feet. In other embodiments, the outriggers 52 extend to a maximum distance less than or greater than eighteen feet (e.g., sixteen feet, twenty feet, etc.). One or more actuators may be positioned to extend portions (e.g., arms, etc.) of each outrigger 52 laterally outward from the fire apparatus 10 and/or portions (e.g., contact pads, etc.) vertically downward towards the ground 98. The actuators may be linear actuators, rotary actuators, or still other types of devices and may be powered hydraulically, pneumatically, electrically, or still otherwise powered.

According to the exemplary embodiment shown in FIGS. 4D and 4E, the downriggers 54 are moveably coupled to the fire apparatus 10. The downriggers 54 may extend outward from each lateral side of the fire apparatus 10, away from the longitudinal axis 14, and parallel to the lateral axis 16. In some embodiments, the downriggers 54 extend to a maximum distance of up to eighteen feet. In other embodiments, the downriggers 54 extend to a maximum distance of less than or greater than eighteen feet (e.g., sixteen feet, twenty feet, etc.). One or more actuators may be positioned to extend portions (e.g., arms, etc.) of each downrigger 54 laterally outward from the rear section 30 and/or portions (e.g., contact pads, etc.) vertically downward towards the ground 98. The actuators may be linear actuators, rotary actuators, or still other types of devices and may be powered hydraulically, electrically, pneumatically, or still otherwise powered.

According to the exemplary embodiment shown in FIGS. 4D and 4E, the stability foot 56 is moveably coupled to the fire apparatus 10. The stability foot 56 may extend vertically downward from the fire apparatus 10. One or more actuators may be positioned to extend portions (e.g., contact pads, etc.) of the stability foot 56 vertically downward towards the ground 98. The actuators may be linear actuators, rotary actuators, or still other types of devices and may be powered hydraulically, pneumatically, electrically, or still otherwise powered.

As shown in FIGS. 1A-3, the fire apparatus 10 includes a powertrain system, shown as powertrain 60. The powertrain 60 may include a primary driver (e.g., an engine, a motor, etc.), an energy generation device (e.g., a generator, etc.), an energy storage device (e.g., a battery, capacitors, ultra-capacitors, etc.) electrically coupled to the energy generation device, and/or a drivetrain (e.g., a transmission, a transfer case, a driveshaft, a differential, the front axle 40, the rear axle(s) 42, the intermediate axle 44, etc.). The primary driver may receive fuel (e.g., gasoline, diesel, etc.) from a fuel tank and combust the fuel to generate mechanical energy. A transmission may receive the mechanical energy and provide an output to the generator. The generator may be configured to convert mechanical energy into electrical energy that may be stored by the energy storage device. The energy storage device may provide electrical energy to a motive driver to drive at least one of the front axle 40, the rear axle(s) 42, and the intermediate axle 44. In some embodiments, the front axle 40, the rear axle(s) 42, and/or the intermediate axle 44 include an individual motive driver (e.g., a motor that is electrically coupled to the energy storage device, etc.) configured to facilitate independently driving each of the wheel and tire assemblies 46. In some embodiments, a transmission of the fire apparatus 10 is rotationally coupled to the primary driver, a transfer case assembly, and one or more drive shafts. The one or more drive shafts may be received by one or more differentials configured to convey the rotational energy of the drive shaft to a final drive (e.g., half-shafts coupled to the wheel and tire assemblies 46, etc.). The final drive may then propel or moves the fire apparatus 10. In such embodiments, the fire apparatus 10 may not include the generator and/or the energy storage device. The powertrain 60 of the fire apparatus 10 may thereby be a hybrid powertrain or a non-hybrid powertrain. According to an exemplary embodiment, the primary driver is a compression-ignition internal combustion engine that utilizes diesel fuel. In alternative embodiments, the primary driver is another type of device (e.g., spark-ignition engine, fuel cell, electric motor, etc.) that is otherwise powered (e.g., with gasoline, compressed natural gas, propane, hydrogen, electricity, etc.).

As shown in FIGS. 1A-3, the fire apparatus 10 includes a ladder assembly, shown as aerial ladder assembly 70. The aerial ladder assembly 70 includes a ladder 72, a turntable assembly, shown as turntable 74, coupled to a first end (e.g., base end, proximal end, pivot end, lower end, etc.) of the ladder 72 and an implement, shown as implement 80, coupled to an opposing, second end (e.g., free end, distal end, platform end, implement end, water nozzle end, etc.) of the ladder 72. According to an exemplary embodiment, the ladder 72 includes a plurality of ladder sections. In some embodiments, the plurality of sections of the ladder 72 are extendable. An actuator may selectively reconfigure the ladder 72 between an extended configuration and a retracted configuration. By way of example, the ladder 72 may include a plurality of nested sections that telescope with respect to one another. In the extended configuration (e.g., deployed position, use position, etc.), the ladder 72 may be lengthened such that the implement 80 is extended away from the fire apparatus 10. In the retracted configuration (e.g., storage position, transport position, etc.), the ladder 72 may be shortened such that the implement 80 is withdrawn towards the fire apparatus 10. In other embodiments, the ladder 72 includes a single, fixed length ladder section. In an alternative embodiment, the fire apparatus 10 does not include the aerial ladder assembly 70, but may alternatively include a boom lift, crane assembly, or another type of moveable and/or extendable assembly.

The turntable 74 may be directly or indirectly coupled to the frame of the fire apparatus 10 (e.g., with an intermediate superstructure, a torque box, via the rear section 30, etc.). According to an exemplary embodiment, the turntable 74 is pivotally coupled to the rear section 30. In some embodiments, the turntable 74 is rotatable a full 360 degrees. In some embodiments, the rotation of the turntable 74 is limited to a range of less than 360 degrees (e.g., dependent on the stability of the fire apparatus 10, the operating parameters of the aerial ladder assembly 70, etc.). The turntable 74 may be coupled to an actuator positioned to facilitate pivoting (e.g., rotating, turning, etc.) the turntable 74. In one embodiment, the actuator is an electric motor (e.g., an alternating current (AC) motor, a direct current motor (DC), etc.) configured to convert electrical energy into mechanical energy. In other embodiments, the actuator is powered by air (e.g., pneumatic, etc.), a fluid (e.g., a hydraulic cylinder, etc.), mechanically (e.g., a flywheel, etc.), or another source. In other embodiments, the turntable 74 is fixed to the rear section 30 (i.e., cannot rotate).

As shown in FIGS. 1A-2, the first end of the ladder 72 is pivotally coupled to the turntable 74 with an actuator, shown as cylinders 76. According to an exemplary embodiment, the cylinders 76 are positioned to pivot the ladder 72 and/or implement 80 vertically about a horizontal axis (e.g., an axis that extends through a pivotal joint between the ladder 72 and the turntable 74, etc.). The actuator may be a linear actuator, a rotary actuator, or still another type of device and may be powered hydraulically, pneumatically, electrically, or still otherwise powered. In one embodiment, the ladder 72 is pivotable between a lowered position (e.g., the position shown in FIGS. 1A-3, etc.) and a raised position. The ladder 72 may be generally horizontal or at an angle (e.g., 10 degrees, etc.) below or above horizontal when disposed in the lowered position (e.g., a stored position, etc.). In one embodiment, extension and retraction of the cylinders 76 pivots the ladder 72 and the implement 80 about the horizontal axis and raises or lowers, respectively, the second end of ladder 72 (e.g., the implement 80, etc.). In the raised position, the aerial ladder assembly 70 facilitates accessing an elevated height (e.g., for a fire fighter, a person being aided by the fire fighter, etc.).

According to the exemplary embodiment shown in FIGS. 1A, 2, and 3, the implement 80 includes an aerial platform, shown as basket 82. The basket 82 may be configured to hold at least one of fire fighters and persons being aided by the fire fighters. The basket 82 may provide a platform from which a fire fighter may complete various tasks (e.g., operate a water nozzle, create ventilation, overhaul a burned area, perform a rescue operation, etc.). According to the exemplary embodiment shown in FIGS. 1B and 2, the implement 80 additionally or alternatively includes a nozzle (e.g., a deluge gun, a water cannon, a deck gun, etc.), shown as water nozzle 84. The water nozzle 84 may be connected to a water source (e.g., a water tank, an external source such as a fire hydrant, etc.) via a conduit extending along the aerial ladder assembly 70 (e.g., along the side of the aerial ladder assembly 70, beneath the aerial ladder assembly 70, in a channel provided in the aerial ladder assembly 70, etc.). By pivoting the aerial ladder assembly 70 into the raised position, the water nozzle 84 may be elevated to facilitate expelling water and/or other fire suppressants from a higher elevation to suppress a fire. In some embodiments, the implement 80 additionally or alternatively includes another type implement (e.g., a tool, a device, a welder, a crane hook, a wrecking ball, etc.). In other embodiments, the aerial ladder assembly 70 does not include the implement 80.

According to an exemplary embodiment, the aerial ladder assembly 70 forms a cantilever structure when at least one of raised vertically and extended horizontally. The aerial ladder assembly 70 is supported by the cylinders 76 and by the turntable 74 at the first end. The aerial ladder assembly 70 supports static loading from its own weight, the weight of any equipment coupled to the ladder 72 (e.g., the implement 80, the basket 82, the water nozzle 84, a water line coupled to the water nozzle 84, a platform, etc.), and the weight of any persons using the ladder 72 and/or the implement 80. The aerial ladder assembly 70 may also support various dynamic loads (e.g., due to forces imparted by a fire fighter or other persons climbing the ladder 72; wind loading; loading due to rotation, elevation, or extension of aerial ladder assembly; the weight of persons in the basket 82; etc.). Such static and dynamic loads are carried by the aerial ladder assembly 70. The forces carried by the cylinders 76, the turntable 74, and/or the frame may be proportional (e.g., directly proportional, etc.) to the length of the ladder 72.

The outriggers 52, the downriggers 54, and/or the stability foot 56 may be used to support the fire apparatus 10 (e.g., while stationary and in use to fight fires, etc.) and/or improve the stability and/or operational capability of the fire apparatus 10 during high loading situation and/or while on uneven surfaces. According to an exemplary embodiment, with the outriggers 52, the downriggers 54, and/or the stability foot 56 extended, the fire apparatus 10 is capable of withstanding a tip capacity of at least 750 pounds applied to the last rung on the ladder 72 and/or to the implement 80 (e.g., the basket 82, etc.) while fully extended (e.g., to provide a horizontal reach of at least 90 feet, to provide a horizontal reach of at least 100 feet, to provide a vertical extension height of at least 95 feet, to provide a vertical extension height of at least 105 feet, to provide a vertical extension height of at least 110 feet, etc.). The outriggers 52, the downriggers 54, and/or the stability foot 56 are positioned to transfer the loading from the aerial ladder assembly 70 to the ground 98. While the fire apparatus 10 is being driven or not in use, the actuators of the outriggers 52, the downriggers 54, and/or the stability foot 56 may retract portions of the outriggers 52, the downriggers 54, and/or the stability foot 56 into a stored position (as shown in FIGS. 1A-3).

Figure 5:
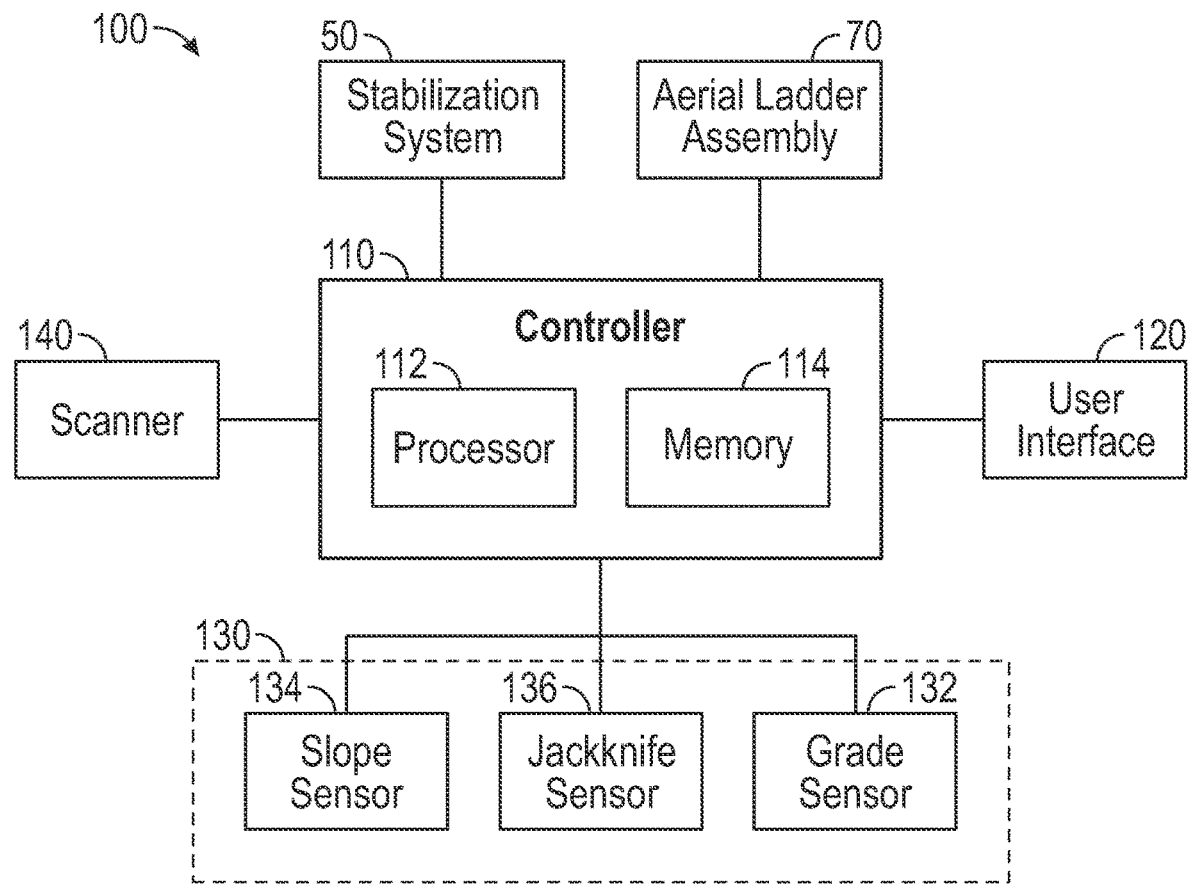
FIG. 5 is a schematic diagram of a control system for a fire apparatus, according to an exemplary embodiment.

As shown in FIGS. 1A-5, the fire apparatus 10 includes a sensor system, shown as sensor system 130. As shown in FIG. 5, the sensor system 130 includes a first sensor, shown as grade sensor 132, a second sensor, shown as slope sensor 134, and a third sensor, shown as jackknife sensor 136. In some embodiment, the sensor system 130 does not include the jackknife sensor 136 (e.g., in embodiments that do not include the tiller fire apparatus 6 or similar vehicle, etc.). According to the exemplary embodiment shown in FIG. 4A, the grade sensor 132 of the sensor system 130 is configured to measure grade data indicative of a grade $\theta$, shown as grade 92, of the fire apparatus 10 (e.g., the angle between the longitudinal axis 14 and a horizontal, etc.). According to the exemplary embodiment shown in FIG. 4B, the slope sensor 134 of the sensor system 130 is configured to measure slope data indicative of a slope $\beta$, shown as slope 94, of the fire apparatus 10 (e.g., the angle between the lateral axis 16 and a horizontal, etc.). According to the exemplary embodiment shown in FIG. 4C, the jackknife sensor 136 of the sensor system 130 is configured to measure jackknife data indicative of a jackknife angle $\gamma$, shown as jackknife angle 96, of the fire apparatus 10 (e.g., the angle between the longitudinal axis 14 and a longitudinal centerline of the rear section 30, etc.). The grade sensor 132, the slope sensor 134, and the jackknife sensor 136 may be positioned at any suitable location on and/or within the fire apparatus 10 to facilitate acquiring the grade data, the slope data, and/or the jackknife data. The sensors may include any suitable sensor configured to measure the respective angles (e.g., gyroscopes, accelerometers, positon sensors, etc.). In one embodiment, the grade sensor 132, the slope sensor 134, and/or the jackknife sensor 136 are included in a single sensor. In other embodiments, the grade sensor 132, the slope sensor 134, and the jackknife sensor 136 are separate sensors.

As shown in FIGS. 4D and 4E, the outriggers 52, the downriggers 54, and/or the stability foot 56 are selectively extendable to engage the ground 98 to facilitate leveling or substantially leveling the fire apparatus 10 to reduce and/or completely mitigate the influence of the grade 92 and/or the slope 94 on the stability of the fire apparatus 10 (e.g., while the aerial ladder assembly 70 is in use, while the fire apparatus 10 is in use on uneven/non-level ground, etc.). As shown in FIGS. 1A-5, the fire apparatus 10 includes a scanner, shown as topography scanner 140. In some embodiments, the fire apparatus 10 does not include the topography scanner 140. According to an exemplary embodiment, the topography scanner 140 is configured to scan the landscape near and/or around the fire apparatus 10 to acquire scan data indicative of topography characteristics of the landscape.

Such scan data may be used to generate a topography mapping of the surrounding landscape to identify curbs, mounds, divots, potholes, boulders, crowns of streets, etc. that may be used with the stabilization system 50 (e.g., the outriggers 52, the downriggers 54, the stability foot 56, etc.) to further level the fire apparatus 10 and/or to further reduce/mitigate the influence of the grade 92 and/or the slope 94 on the operational capability of the fire apparatus 10.

As shown in FIG. 5, the level indication and control system 100 of the fire apparatus 10 includes a controller, shown as controller 110. In one embodiment, the controller 110 is configured to selectively engage, selectively disengage, control, and/or otherwise communicate with components of the fire apparatus 10 (e.g., actively control the components thereof, etc.). As shown in FIG. 5, the controller 110 is coupled to the stabilization system 50 (e.g., the outriggers 52, the downriggers 54, the stability foot 56, etc.), the aerial ladder assembly 70 (e.g., the cylinders 76, the implement 80, the turntable 74, the ladder 72, etc.), a user interface 120, the sensor system 130 (e.g., the grade sensor 132, the slope sensor 134, the jackknife sensor 136, etc.), and the topography scanner 140. In other embodiments, the controller 110 is coupled to more or fewer components. The controller 110 may send and receive signals with the stabilization system 50, the aerial ladder assembly 70, the user interface 120, the sensor system 130, and/or the topography scanner 140. By way of example, the level indication and control system 100 may selectively indicate and/or actively limit the operational capability of the fire apparatus 10 and/or the aerial ladder assembly 70 to facilitate leveling and/or maintaining the operability of the fire apparatus 10 during loading situations on the aerial ladder assembly 70 and/or while the fire apparatus 10 is located/situated on uneven ground.

The controller 110 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 5, the controller 110 includes a processing circuit 112 and a memory 114. Processing circuit 112 may include an ASIC, one or more FPGAs, a DSP, circuits containing one or more processing components, circuitry for supporting a microprocessor, a group of processing components, or other suitable electronic processing components. In some embodiments, processing circuit 112 is configured to execute computer code stored in memory 114 to facilitate the activities described herein. Memory 114 may be any volatile or non-volatile computer-readable storage medium capable of storing data or computer code relating to the activities described herein. According to an exemplary embodiment, memory 114 includes computer code modules (e.g., executable code, object code, source code, script code, machine code, etc.) configured for execution by processing circuit 112. Memory 114 includes various thresholds and/or ranges that define operational modes for the fire apparatus, according to an exemplary embodiment. In some embodiments, controller 110 may represent a collection of processing devices (e.g., servers, data centers, etc.). In such cases, processing circuit 112 represents the collective processors of the devices, and memory 114 represents the collective storage devices of the devices.

In one embodiment, the user interface 120 includes a display and an operator input. The display may be configured to display a graphical user interface, an image, an icon, a notification, and indication, and/or still other information. In one embodiment, the display includes a graphical user interface configured to provide general information about the fire apparatus 10 (e.g., vehicle speed, fuel level, warning lights, etc.). The graphical user interface may also be configured to display an indication regarding the operational capability of the fire apparatus 10 based at least in part on the grade 92, the slope 94, and/or the jackknife angle 96. The graphical user interface may be configured to display still other information relating to the one or more components of the fire apparatus 10 (e.g., the stabilization system 50, the aerial ladder assembly 70, the topography scanner 140, the sensor system 130, etc.).

The operator input may be used by an operator to provide commands and/or information (e.g., regarding characteristics and/or parameters of the fire apparatus 10 and/or one or more components thereof, etc.) to at least one of the stabilization system 50, the aerial ladder assembly 70, the user interface 120, the sensor system 130, and the topography scanner 140. The operator input may include one or more buttons, knobs, touchscreens, switches, levers, joysticks, pedals, a steering wheel, and/or handles. The operator input may facilitate manual and/or automatic control of some or all aspects of the operation of the fire apparatus 10. The operator input and/or the display of the user interface 120 may be positioned within the front cabin 20, on the turntable 74, on the implement 80 (e.g., the basket 82, etc.), and/or still otherwise positioned. It should be understood that any type of display or input controls may be implemented with the systems and methods described herein.

According to an exemplary embodiment, the controller 110 is configured to receive and store various parameters and/or characteristics of the fire apparatus 10. By way of example, the parameters and/or characteristics of the fire apparatus 10 may include information regarding the type of vehicle the fire apparatus 10 is (e.g., the tandem rear axle fire apparatus 2, the single rear axle fire apparatus 4, the tiller fire apparatus 6, etc.), wheelbase, axle track, weight, longitudinal length, lateral width, center of gravity, center of mass, performance characteristics of the stabilization system 50 (e.g., a maximum lateral extension distance, a maximum vertical extension distance, etc. of the outriggers 52, the downriggers 54, the stability foot 56; the number and/or placement of the outriggers 52, the downriggers 54, the stability foot 56; etc.), performance characteristics of the aerial ladder assembly 70 (e.g., maximum tip load, maximum horizontal reach, maximum vertical extension height, etc.), and/or still other parameters and/or characteristics of the fire apparatus 10. The parameters and/or characteristics of the fire apparatus 10 may be used by the controller 110 to determine the operational capability of the fire apparatus 10.

According to an exemplary embodiment, the controller 110 is configured to receive and store various operational thresholds and/or operational ranges for the fire apparatus 10. The operational thresholds and/or operational ranges for the fire apparatus 10 may define the operational capability of and the ability to stabilize the fire apparatus 10 while on uneven ground and/or while the aerial ladder assembly 70 is in use. According to an exemplary embodiment, the operational thresholds and/or operational ranges for a vehicle vary based on vehicle type, vehicle model, etc. (e.g., the operational thresholds and/or operational ranges are vehicle specific, etc.). According to the exemplary embodiment, the operational thresholds and/or the operational ranges may be defined for the grade 92, the slope 94, and/or the jackknife angle 96.

Figure 6:
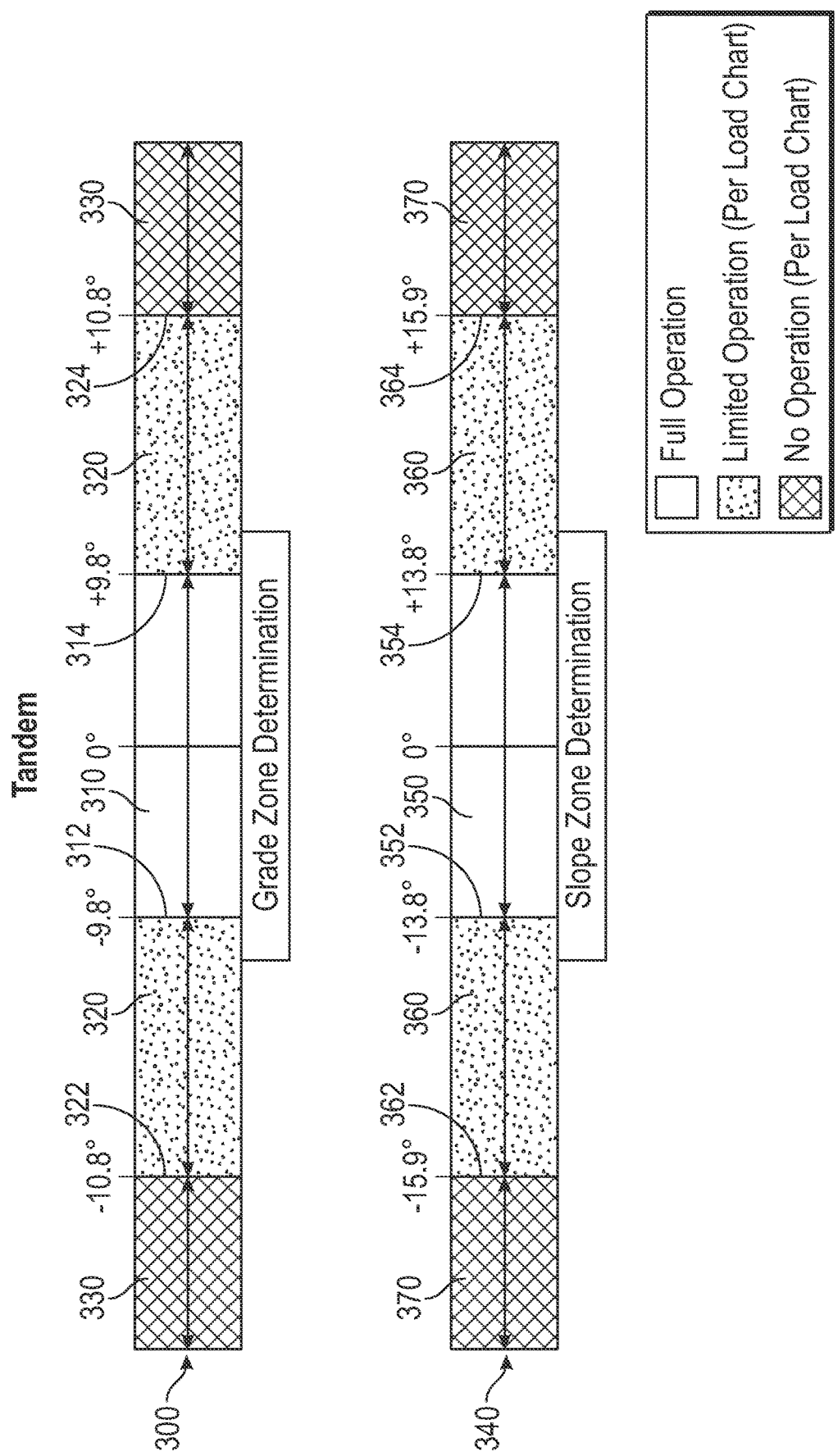
FIG. 6 is a grade and slope zone determination chart for a tandem rear axle fire apparatus, according to an exemplary embodiment.

As shown in FIG. 6, the controller 110 may receive and store first operational thresholds and operational ranges, shown as grade determination parameters 300, and second operational thresholds and operational ranges, shown as slope determination parameters 340. According to the exemplary embodiment shown in FIG. 6, the grade determination parameters 300 and the slope determination parameters 340 are configured to be applied in embodiments including the tandem rear axle fire apparatus 2 or other tandem rear axle vehicles. In some embodiments, the grade determination parameters 300 and the slope determination parameters 340 are configured to be applied in embodiments including the single rear axle fire apparatus 4 or other single rear axle vehicles.

As shown in FIG. 6, the grade determination parameters 300 include a first operation range, shown as unrestricted grade range 310, a second operation range, shown as restricted grade range 320, and a third operation range, shown as nonoperational grade range 330. As shown in FIG. 6, the unrestricted grade range 310 is defined between a first negative grade threshold 312 and a first positive grade threshold 314. According to the exemplary embodiment shown in FIG. 6, the first negative grade threshold 312 is −9.8 degrees and the first positive grade threshold 314 is +9.8 degrees. In other embodiments, the first negative grade threshold 312 and/or the first positive grade threshold 314 have different values (e.g., −11, −9, −8, +8, +9, +11, etc. degrees). In some embodiments, the first negative grade threshold 312 and the first positive grade threshold 314 have the same magnitude. In some embodiments, the first negative grade threshold 312 and the first positive grade threshold 314 have different magnitudes.

As shown in FIG. 6, the restricted grade range 320 is defined between (i) the first negative grade threshold 312 and a second negative grade threshold 322 and (ii) the first positive grade threshold 314 and a second positive grade threshold 324. In other embodiments, the restricted grade range 320 is defined between (i) an intermediate negative grade threshold (e.g., −9.9 degrees, etc.) and the second negative grade threshold 322 and (ii) an intermediate positive grade threshold (e.g., +9.9 degrees, etc.) and the second positive grade threshold 324. According to the exemplary embodiment shown in FIG. 6, the second negative grade threshold 322 is −10.8 degrees and the second positive grade threshold 324 is +10.8 degrees. In other embodiments, the second negative grade threshold 322 and/or the second positive grade threshold 324 have different values (e.g., −15, −12, −11, +11, +12, +15, etc. degrees). In some embodiments, the second negative grade threshold 322 and the second positive grade threshold 324 have the same magnitude. In some embodiments, the second negative grade threshold 322 and the second positive grade threshold 324 have different magnitudes. As shown in FIG. 6, the nonoperational grade range 330 is defined as being less than the second negative grade threshold 322 and greater than the second positive grade threshold 324.

As shown in FIG. 6, the slope determination parameters 340 include a first operation range, shown as unrestricted slope range 350, a second operation range, shown as restricted slope range 360, and a third operation range, shown as nonoperational slope range 370. As shown in FIG. 6, the unrestricted slope range 350 is defined between a first negative slope threshold 352 and a first positive slope threshold 354. According to the exemplary embodiment shown in FIG. 6, the first negative slope threshold 352 is −13.8 degrees and the first positive slope threshold 354 is +13.8 degrees. In other embodiments, the first negative slope threshold 352 and/or the first positive slope threshold 354 have different values (e.g., −15, −14, −10, +10, +14, +15, etc. degrees). In some embodiments, the first negative slope threshold 352 and the first positive slope threshold 354 have the same magnitude. In some embodiments, the first negative slope threshold 352 and the first positive slope threshold 354 have different magnitudes.

As shown in FIG. 6, the restricted slope range 360 is defined between (i) the first negative slope threshold 352 and a second negative slope threshold 362 and (ii) the first positive slope threshold 354 and a second positive slope threshold 364. In other embodiments, the restricted slope range 360 is defined between (i) an intermediate negative slope threshold (e.g., −13.9 degrees, etc.) and the second negative slope threshold 362 and (ii) an intermediate positive slope threshold (e.g., +13.9 degrees, etc.) and the second positive slope threshold 364. According to the exemplary embodiment shown in FIG. 6, the second negative slope threshold 362 is −15.9 degrees and the second positive slope threshold 364 is +15.9 degrees. In other embodiments, the second negative slope threshold 362 and/or the second positive slope threshold 364 have different values (e.g., −20, −17, −11, +11, +17, +20, etc. degrees). In some embodiments, the second negative slope threshold 362 and the second positive slope threshold 364 have the same magnitude. In some embodiments, the second negative slope threshold 362 and the second positive slope threshold 364 have different magnitudes. As shown in FIG. 6, the nonoperational slope range 370 is defined as being less than the second negative slope threshold 362 and greater than the second positive slope threshold 364.

Figure 7:
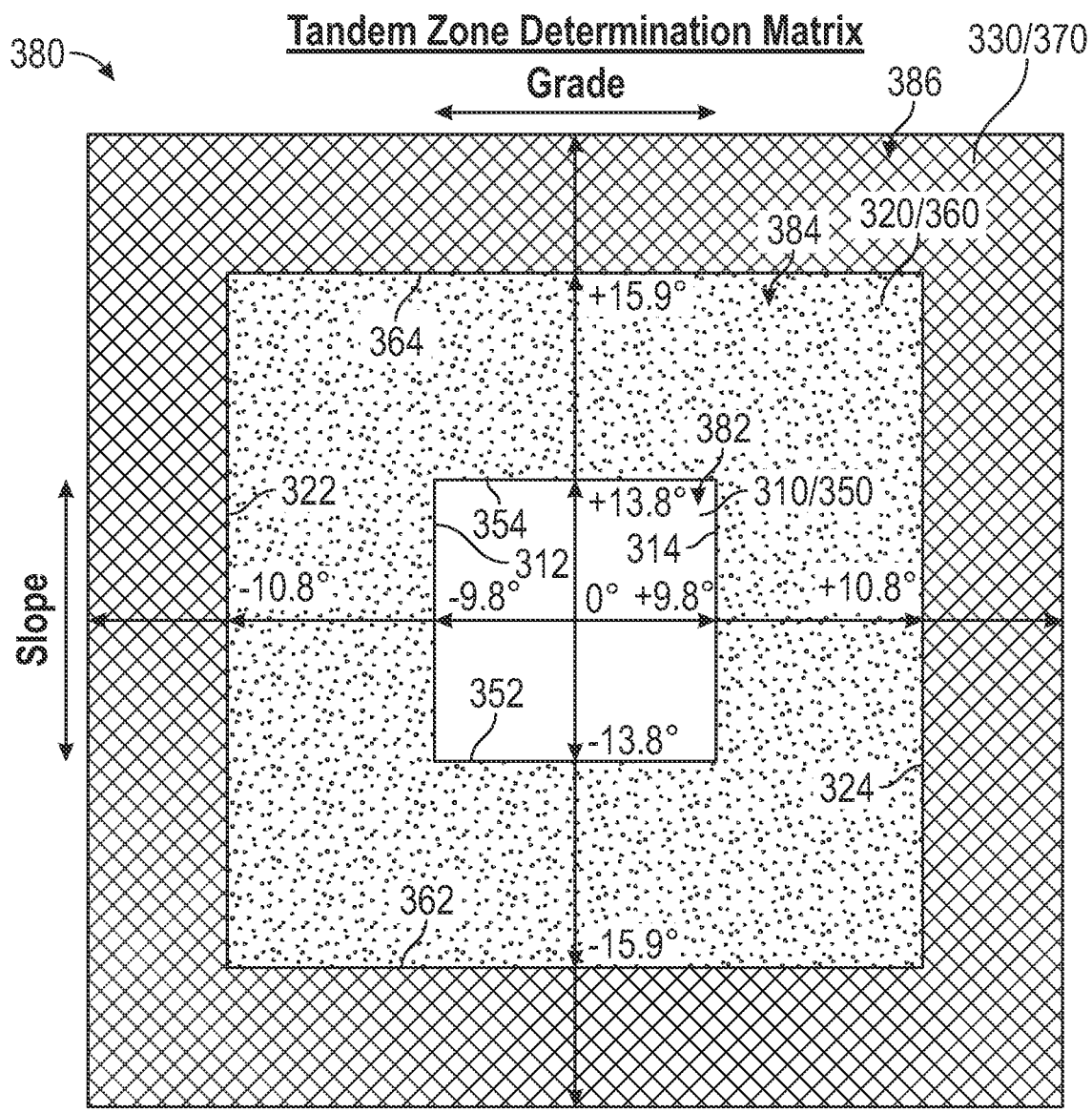
FIG. 7 is a grade and slope zone determination matrix for a tandem rear axle fire apparatus, according to an exemplary embodiment.

As shown in FIG. 7, the grade determination parameters 300 and the slope determination parameters 340 are combined to form a matrix, shown as grade and slope operation matrix 380. The grade and slope operation matrix 380 includes a first zone, show as unrestricted zone 382, defined by the unrestricted grade range 310 and the unrestricted slope range 350; a second zone, shown as restricted zone 384, defined by the restricted grade range 320 and the restricted slope range 360; and a third zone, shown as nonoperational zone 386, defined by the nonoperational grade range 330 and the nonoperational slope range 370. According to the exemplary embodiment shown in FIG. 7, the unrestricted zone 382, the restricted zone 384, and the nonoperational zone 386 are rectangular in shape. In other embodiments, the unrestricted zone 382, the restricted zone 384, and/or the nonoperational zone 386 are otherwise shaped (e.g., diamond, circular, oblong, etc.).

Figure 8:
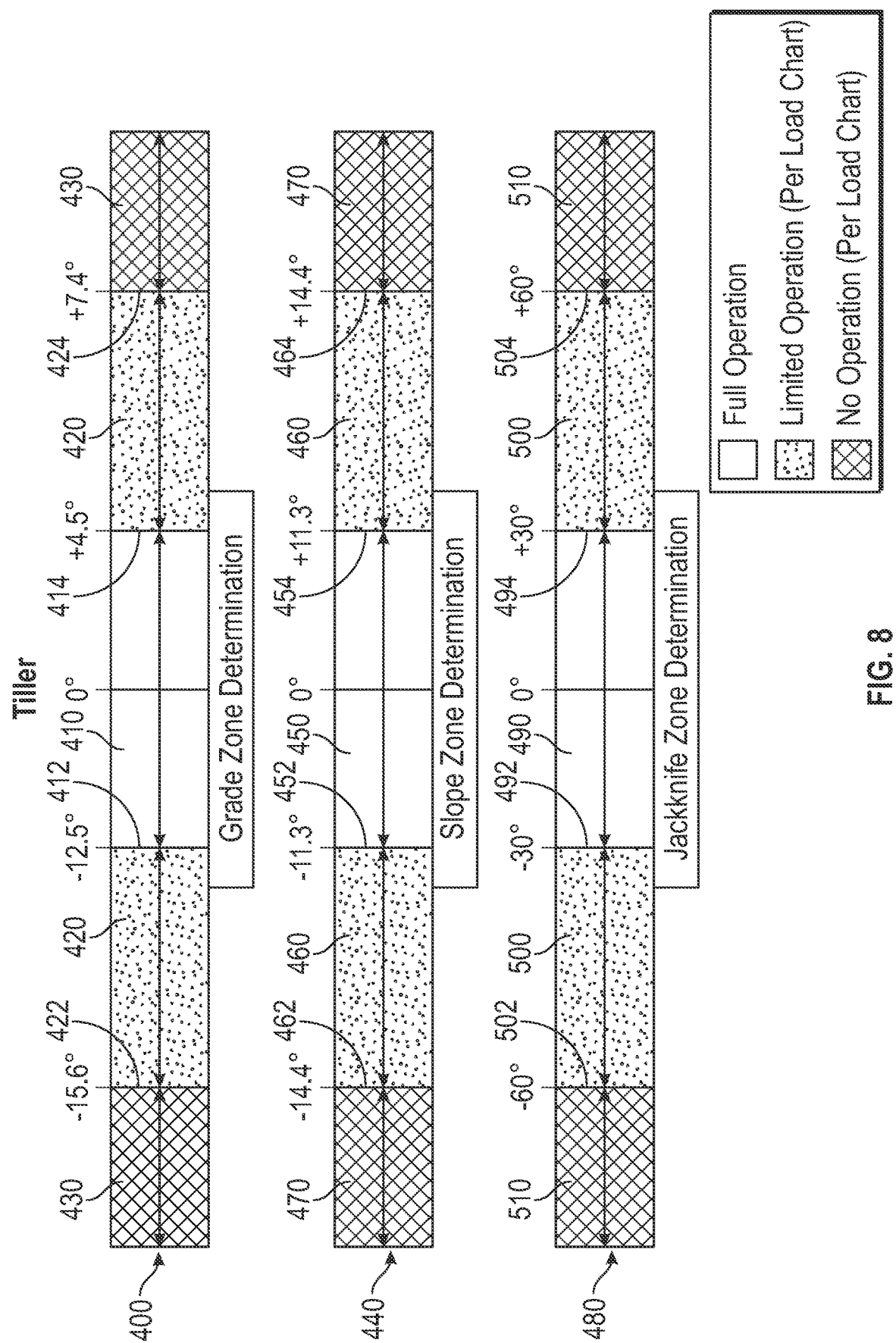
FIG. 8 is a grade, slope, and jackknife zone determination chart for a tiller fire apparatus, according to an exemplary embodiment.

As shown in FIG. 8, the controller 110 may additionally or alternatively receive and store third operational thresholds and operational ranges, shown as grade determination parameters 400, fourth operational thresholds and operational ranges, shown as slope determination parameters 440, and fifth operational thresholds and operational ranges, shown as jackknife angle determination parameters 480. According to the exemplary embodiment shown in FIG. 7, the grade determination parameters 400, the slope determination parameters 440, and the jackknife angle determination parameters 480 are configured to be applied in embodiments including the tiller fire apparatus 6 or a similar type of vehicle.

As shown in FIG. 8, the grade determination parameters 400 include a first operation range, shown as unrestricted grade range 410, a second operation range, shown as restricted grade range 420, and a third operation range, shown as nonoperational grade range 430. As shown in FIG. 8, the unrestricted grade range 410 is defined between a first negative grade threshold 412 and a first positive grade threshold 414. According to the exemplary embodiment shown in FIG. 8, the first negative grade threshold 412 is −12.5 degrees and the first positive grade threshold 414 is +4.5 degrees. In other embodiments, the first negative grade threshold 412 and/or the first positive grade threshold 414 have different values (e.g., −15, −11, −8, +2, +6, +9, etc. degrees). In some embodiments, the first negative grade threshold 412 and the first positive grade threshold 414 have the same magnitude. In some embodiments, the first negative grade threshold 412 and the first positive grade threshold 414 have different magnitudes.

As shown in FIG. 8, the restricted grade range 420 is defined between (i) the first negative grade threshold 412 and a second negative grade threshold 422 and (ii) the first positive grade threshold 414 and a second positive grade threshold 424. In other embodiments, the restricted grade range 420 is defined between (i) an intermediate negative grade threshold (e.g., −12.6 degrees, etc.) and the second negative grade threshold 422 and (ii) an intermediate positive grade threshold (e.g., +4.6 degrees, etc.) and the second positive grade threshold 424. According to the exemplary embodiment shown in FIG. 8, the second negative grade threshold 422 is −15.6 degrees and the second positive grade threshold 424 is +7.4 degrees. In other embodiments, the second negative grade threshold 422 and/or the second positive grade threshold 424 have different values (e.g., −20, −17, −12, +5, +9, +10, etc. degrees). In some embodiments, the second negative grade threshold 422 and the second positive grade threshold 424 have the same magnitude. In some embodiments, the second negative grade threshold 422 and the second positive grade threshold 424 have different magnitudes. As shown in FIG. 8, the nonoperational grade range 430 is defined as being less than the second negative grade threshold 422 and greater than the second positive grade threshold 424.

As shown in FIG. 8, the slope determination parameters 440 include a first operation range, shown as unrestricted slope range 450, a second operation range, shown as restricted slope range 460, and a third operation range, shown as nonoperational slope range 470. As shown in FIG. 8, the unrestricted slope range 450 is defined between a first negative slope threshold 452 and a first positive slope threshold 454. According to the exemplary embodiment shown in FIG. 8, the first negative slope threshold 452 is −11.3 degrees and the first positive slope threshold 454 is +11.3 degrees. In other embodiments, the first negative slope threshold 452 and/or the first positive slope threshold 454 have different values (e.g., −15, −13, −8, +8, +13, +15, etc. degrees). In some embodiments, the first negative slope threshold 452 and the first positive slope threshold 454 have the same magnitude. In some embodiments, the first negative slope threshold 452 and the first positive slope threshold 454 have different magnitudes.

As shown in FIG. 8, the restricted slope range 460 is defined between (i) the first negative slope threshold 452 and a second negative slope threshold 462 and (ii) the first positive slope threshold 454 and a second positive slope threshold 464. In other embodiments, the restricted slope range 460 is defined between (i) an intermediate negative slope threshold (e.g., −11.4 degrees, etc.) and the second negative slope threshold 462 and (ii) an intermediate positive slope threshold (e.g., +11.4 degrees, etc.) and the second positive slope threshold 464. According to the exemplary embodiment shown in FIG. 8, the second negative slope threshold 462 is −14.4 degrees and the second positive slope threshold 464 is +14.4 degrees. In other embodiments, the second negative slope threshold 462 and/or the second positive slope threshold 464 have different values (e.g., −20, −17, −11, +11, +17, +20, etc. degrees). In some embodiments, the second negative slope threshold 462 and the second positive slope threshold 464 have the same magnitude. In some embodiments, the second negative slope threshold 462 and the second positive slope threshold 464 have different magnitudes. As shown in FIG. 8, the nonoperational slope range 470 is defined as being less than the second negative slope threshold 462 and greater than the second positive slope threshold 464.

As shown in FIG. 8, the jackknife angle determination parameters 480 include a first operation range, shown as unrestricted jackknife angle range 490, a second operation range, shown as restricted jackknife angle range 500, and a third operation range, shown as nonoperational jackknife angle range 510. As shown in FIG. 8, the unrestricted jackknife angle range 490 is defined between a first negative jackknife angle threshold 492 and a first positive jackknife angle threshold 494. According to the exemplary embodiment shown in FIG. 8, the first negative jackknife angle threshold 492 is −30 degrees and the first positive jackknife angle threshold 494 is +30 degrees. In other embodiments, the first negative jackknife angle threshold 492 and/or the first positive jackknife angle threshold 494 have different values (e.g., −45, −25, −15, +15, +25, +45, etc. degrees). In some embodiments, the first negative jackknife angle threshold 492 and the first positive jackknife angle threshold 494 have the same magnitude. In some embodiments, the first negative jackknife angle threshold 492 and the first positive jackknife angle threshold 494 have different magnitudes.

As shown in FIG. 8, the restricted jackknife angle range 500 is defined between (i) the first negative jackknife angle threshold 492 and a second negative jackknife angle threshold 502 and (ii) the first positive jackknife angle threshold 494 and a second positive jackknife angle threshold 504. In other embodiments, the restricted jackknife angle range 500 is defined between (i) an intermediate negative jackknife angle threshold (e.g., −31 degrees, etc.) and the second negative jackknife angle threshold 502 and (ii) an intermediate positive jackknife angle threshold (e.g., +31 degrees, etc.) and the second positive jackknife angle threshold 504. According to the exemplary embodiment shown in FIG. 8, the second negative jackknife angle threshold 502 is −60 degrees and the second positive jackknife angle threshold 504 is +60 degrees. In other embodiments, the second negative jackknife angle threshold 502 and/or the second positive jackknife angle threshold 504 have different values (e.g., −75, −50, −45, +45, +50, +75, etc. degrees). In some embodiments, the second negative jackknife angle threshold 502 and the second positive jackknife angle threshold 504 have the same magnitude. In some embodiments, the second negative jackknife angle threshold 502 and the second positive jackknife angle threshold 504 have different magnitudes. As shown in FIG. 8, the nonoperational jackknife angle range 510 is defined as being less than the second negative jackknife angle threshold 502 and greater than the second positive jackknife angle threshold 504.

According to an exemplary embodiment, the controller 110 is configured to receive stability data including the grade data (e.g., regarding the grade 92, etc.) acquired by the grade sensor 132, the slope data (e.g., regarding the slope 94, etc.) acquired by the slope sensor 134, and/or the jackknife data (e.g., regarding the jackknife angle 96, etc.) acquired by the jackknife sensor 136 of the sensor system 130. The controller 110 is configured to compare the stability data to the operational thresholds and operational ranges for the fire apparatus 10 to determine whether the stabilization system 50 may be activated in such a way that the fire apparatus 10 is reconfigurable to facilitate at least one of (i) full, unrestricted operation and (ii) at least partially limited or restricted operation of the fire apparatus 10, according to an exemplary embodiment. Such a determination may take into account the parameters and/or characteristics of the fire apparatus 10 including the type of vehicle the fire apparatus 10 is (e.g., the tandem rear axle fire apparatus 2, the single rear axle fire apparatus 4, the tiller fire apparatus 6, etc.), wheelbase, axle track, weight, longitudinal length, lateral width, center of gravity, center of mass, performance characteristics of the stabilization system 50 (e.g., a maximum lateral extension distance, a maximum vertical extension distance, etc. of the outriggers 52, the downriggers 54, the stability foot 56; the number and/or placement of the outriggers 52, the downriggers 54, the stability foot 56; etc.), performance characteristics of the aerial ladder assembly 70 (e.g., maximum tip load, maximum horizontal reach, maximum vertical extension height, etc.), and/or still other parameters and/or characteristics of the fire apparatus 10. The controller 110 may thereby be configured to make the determination regarding the operational capability of the fire apparatus 10 based on (i) the stability data, (ii) the operational thresholds and operational ranges for the fire apparatus 10, and/or (iii) the parameters and/or characteristics of the fire apparatus 10. The controller 110 may make the determination using a look-up table, an algorithm, a model, and/or still another suitable method.

By way of example, the controller 110 may be configured to determine whether the grade 92, the slope 94, and/or the jackknife angle 96 of the fire apparatus 10 are within a respective nonoperational grade, slope, and/or jackknife angle range (e.g., the nonoperational grade range 330, the nonoperational grade range 430, the nonoperational slope range 370, the nonoperational slope range 470, the nonoperational jackknife angle range 510, etc.). The controller 110 may be configured to provide an indication (e.g., a notification, a warning, etc.) on the display of the user interface 120 that the fire apparatus 10 should not be set up in its current location and/or orientation as the stabilization system 50 may not be capable of leveling and/or facilitating the operability of the fire apparatus 10 in response to the grade 92, the slope 94, and/or the jackknife angle 96 being within the respective nonoperational grade, slope, and/or jackknife angle range (e.g., exceeding the leveling capability of the stabilization system 50, etc.).

By way of another example, the controller 110 may be configured to determine whether the grade 92, the slope 94, and/or the jackknife angle 96 of the fire apparatus 10 are within a respective unrestricted grade, slope, and/or jackknife angle range (e.g., the unrestricted grade range 310, the unrestricted grade range 410, the unrestricted slope range 350, the unrestricted slope range 450, the unrestricted jackknife angle range 490, etc.). The controller 110 may be configured to provide an indication (e.g., a notification, a warning, etc.) on the display of the user interface 120 that the stabilization system 50 of the fire apparatus 10 is capable of reconfiguring the fire apparatus 10 such that the fire apparatus 10 (e.g., the aerial ladder assembly 70, the implement 80, etc.) may be operated with full, uninhibited operation (e.g., the aerial ladder assembly 70 may be operated with a maximum tip load, a maximum horizontal reach, a maximum vertical extension height, full rotation, etc.).

By way of another example, the controller 110 may be configured to determine whether the grade 92, the slope 94, and/or the jackknife angle 96 of the fire apparatus 10 are within a respective restricted grade, slope, and/or jackknife angle range (e.g., the restricted grade range 320, the restricted grade range 420, the restricted slope range 360, the restricted slope range 460, the restricted jackknife angle range 500, etc.). The controller 110 may be configured to provide an indication (e.g., a notification, a warning, etc.) on the display of the user interface 120 that the stabilization system 50 of the fire apparatus 10 is capable of reconfiguring the fire apparatus 10 such that the fire apparatus 10 (e.g., the aerial ladder assembly 70, the implement 80, etc.) may be operated with at least partially restricted or limited operation. In one example, limiting the operation of the fire apparatus 10 may include indicating and/or actively preventing use of the aerial ladder assembly beyond various thresholds. The limits set on the operation of the aerial ladder assembly 70 by the various thresholds may include (i) operating the aerial ladder assembly with less than a maximum tip load, (ii) operating the aerial ladder assembly 70 at a horizontal reach less than the maximum horizontal reach, (iii) operating the aerial ladder assembly 70 at a vertical extension height less than the maximum vertical extension height, and/or (iv) operating the aerial ladder assembly 70 within a lesser rotational span relative to full rotation (e.g., 270 degrees, 180 degrees, etc.). The limits set on the operation of the aerial ladder assembly 70 by the various thresholds may be static and/or dynamic (e.g., adaptive based on the various operating parameters of the fire apparatus 10 at a given moment, etc.). The controller 110 may thereby be configured to actively and adaptively limit and/or otherwise control the aerial ladder assembly 70 according to the dynamic thresholds.

In one embodiment, the stabilization system 50 is manually engaged (e.g., activated, extended, set up, etc.) by an operator of the fire apparatus 10 (e.g., using the operator input of the user interface 120, etc.) to facilitate operating the fire apparatus 10 at the restricted or the unrestricted operation. In another embodiment, the controller 110 is configured to automatically engage (e.g., activate, extend, set up, etc.) the stabilization system 50 to facilitate operating the fire apparatus 10 at the restricted or the unrestricted operation (e.g., in response to an operator providing a command to set up the fire apparatus 10 in the current location after evaluating the feedback received on the display of the user interface 120, etc.).

In some embodiments, the controller 110 is configured to receive the scan data regarding the topography characteristics of the landscape around the fire apparatus 10 from the topography scanner 140. The controller 110 may be configured to determine whether the topography characteristics around the fire apparatus 10 may be used by the stabilization system 50 to improve the grade 92 and/or the slope 94 of the fire apparatus 10 to potentially increase the capability of the fire apparatus 10 from (i) a nonoperational state to a restricted operation state or (ii) a restricted operation state to an unrestricted operation state. By way of example, the outriggers 52 of the stabilization system may be extended to align with a curb to provide an elevated contact point that may facilitate improving the grade 92 and/or the slope 94 of the fire apparatus from within (i) a respective nonoperation range to a respective restricted operation range or (ii) a respective restricted operation range to a respective unrestricted operation range.

Figure 9:
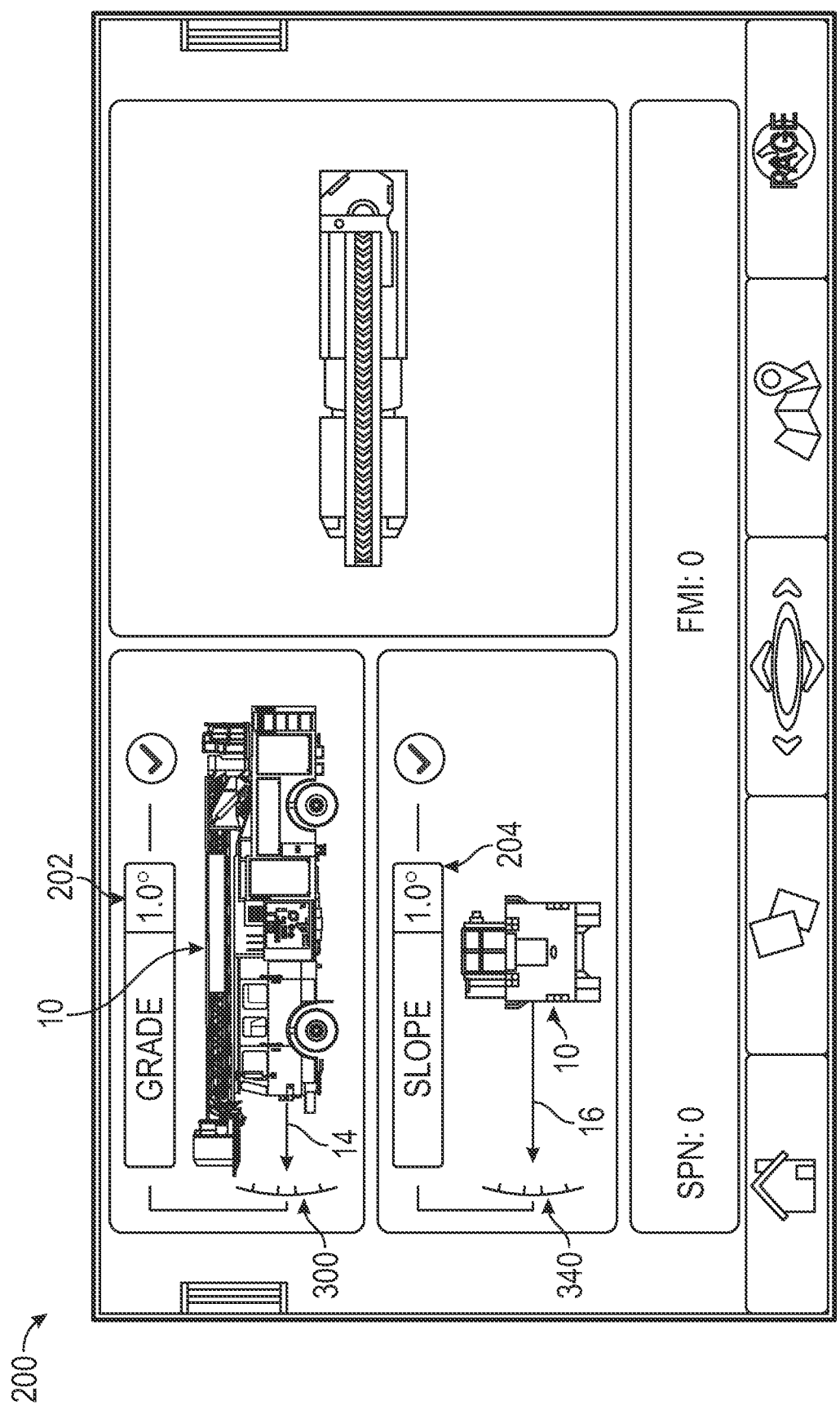
FIGS. 9 and 10 are various graphical user interfaces displaying grade and slope of a fire apparatus, according to an exemplary embodiment.
Figure 10:
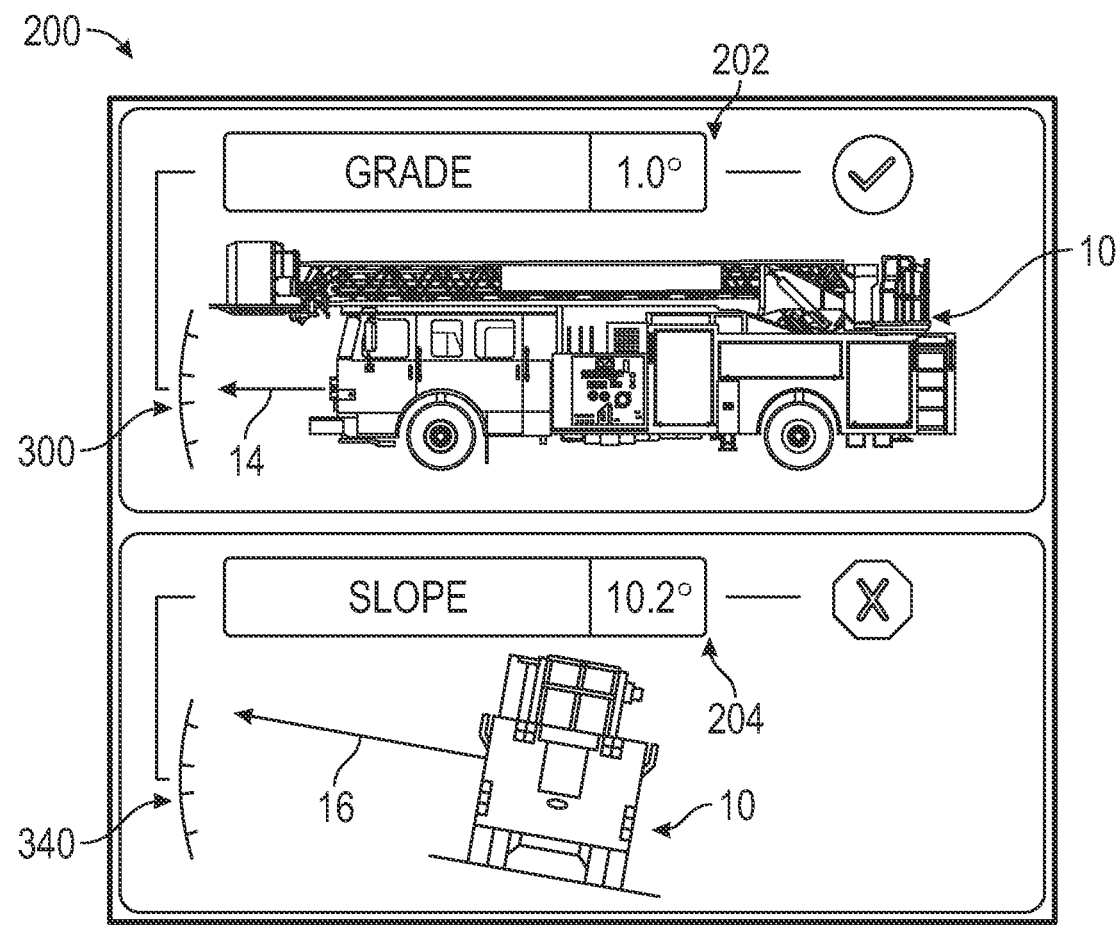

As shown in FIGS. 9 and 10, a first graphical user interface ("GUI"), shown as GUI 200, includes a first indicator, shown as grade indicator 202, and a second indicator, shown as slope indicator 204. As shown in FIG. 9, the grade indicator 202 indicates that the longitudinal axis 14 and therefore the grade 92 of the fire apparatus 10 is within the unrestricted grade range 310 of the grade determination parameters 300. The slope indicator 204 indicates that the lateral axis 16 and therefore the slope 94 of the fire apparatus 10 is within the unrestricted slope range 350 of the slope determination parameters 340. According to the exemplary embodiment shown in FIG. 9, the grade indicator 202 provides a first visual indicia (e.g., a green check mark, etc.) to indicate that the grade 92 is within the unrestricted grade range 310 and the slope indicator 204 provides a second visual indicia (e.g., a green check mark, etc.) to indicate that the slope 94 is within the unrestricted slope range 350. The visual indicia of the GUI 200 of FIG. 9 therefore indicate that the fire apparatus 10 is reconfigurable such that the fire apparatus is operable with full, unrestricted operation.

As shown in FIG. 10, the grade indicator 202 indicates that the longitudinal axis 14 and therefore the grade 92 of the fire apparatus 10 is within the unrestricted grade range 310 of the grade determination parameters 300. The slope indicator 204 indicates that the lateral axis 16 and therefore the slope 94 of the fire apparatus 10 is within the nonoperational slope range 370 of the slope determination parameters 340. According to the exemplary embodiment shown in FIG. 10, the grade indicator 202 provides a first visual indicia (e.g., a green check mark, etc.) to indicate that the grade 92 is within the unrestricted grade range 310 and the slope indicator 204 provides a second visual indicia (e.g., a red "X" mark, etc.) to indicate that the slope 94 is within the nonoperational slope range 370. The visual indicia of the GUI 200 of FIG. 10 therefore indicate that the fire apparatus 10 should not be set up and stabilized at the current location (e.g., due to the slope 94 being within the nonoperational slope range 370, etc.).

Figure 11:
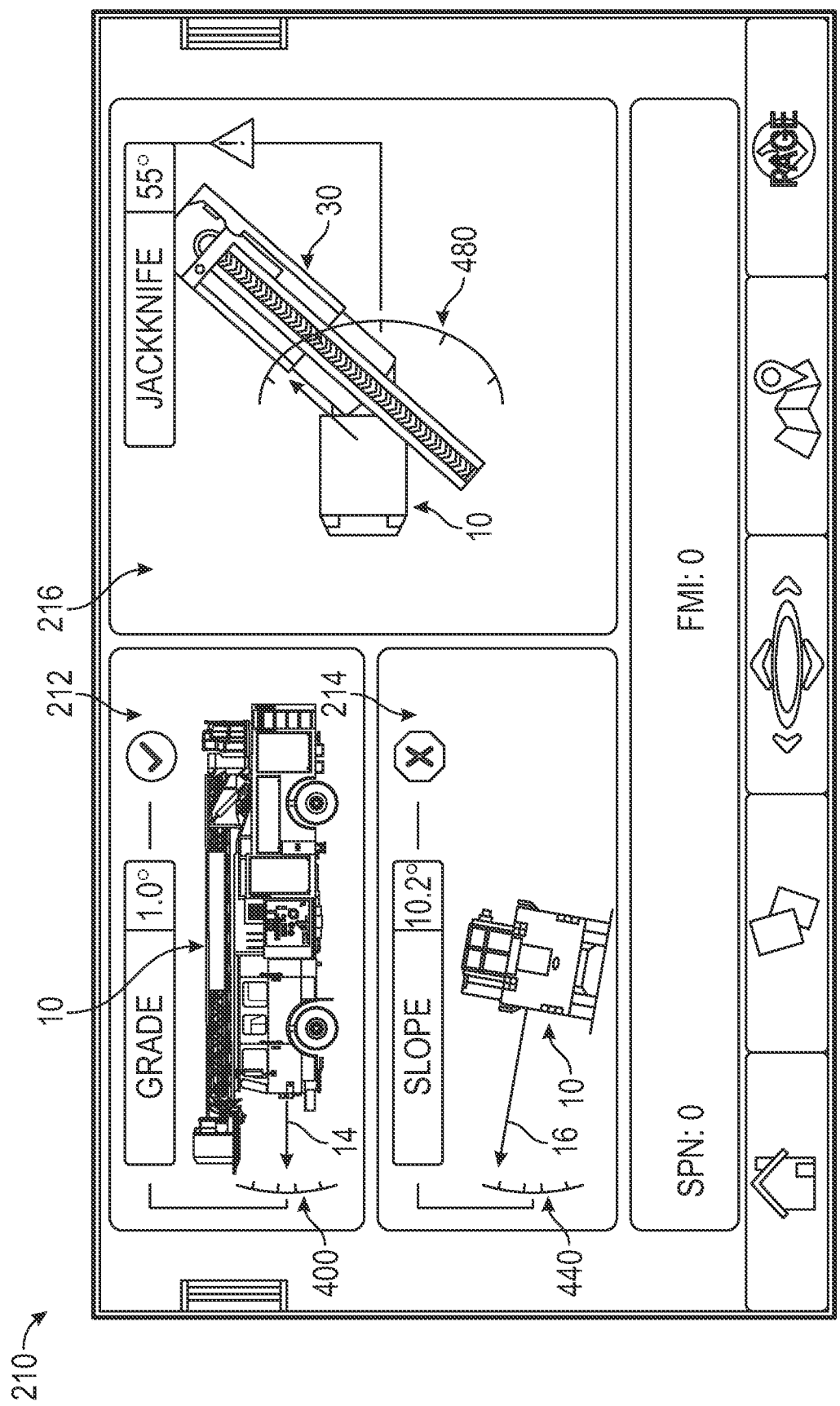
FIG. 11 is a graphical user interfaces displaying grade, slope, and jackknife angle of a fire apparatus, according to an exemplary embodiment.

As shown in FIG. 11, a second GUI, shown as GUI 210, includes a first indicator, shown as grade indicator 212, a second indicator, shown as slope indicator 214, and a third indicator, shown as jackknife indicator 216. The grade indicator 212 indicates that the longitudinal axis 14 and therefore the grade 92 of the fire apparatus 10 is within the unrestricted grade range 410 of the grade determination parameters 400. The slope indicator 214 indicates that the lateral axis 16 and therefore the slope 94 of the fire apparatus 10 is within the nonoperational slope range 470 of the slope determination parameters 440. The jackknife indicator 216 indicates that the rear section 30 and therefore the jackknife angle 96 is within the restricted jackknife angle range 500 of the jackknife angle determination parameters 480. According to the exemplary embodiment shown in FIG. 11, the grade indicator 212 provides a first visual indicia (e.g., a green check mark, etc.) to indicate that the grade 92 is within the unrestricted grade range 410, the slope indicator 214 provides a second visual indicia (e.g., a red "X" mark, etc.) to indicate that the slope 94 is within the nonoperational slope range 470, and the jackknife indicator 216 provides a third visual indicia (e.g., a yellow exclamation mark, etc.) to indicate caution and that the jackknife angle 96 is within the restricted jackknife angle range 500. The visual indicia of the GUI 210 of FIG. 11 therefore indicate that the fire apparatus 10 should not be set up and stabilized at the current location (e.g., due to the slope 94 being within the nonoperational slope range 470, etc.).

Figure 12:
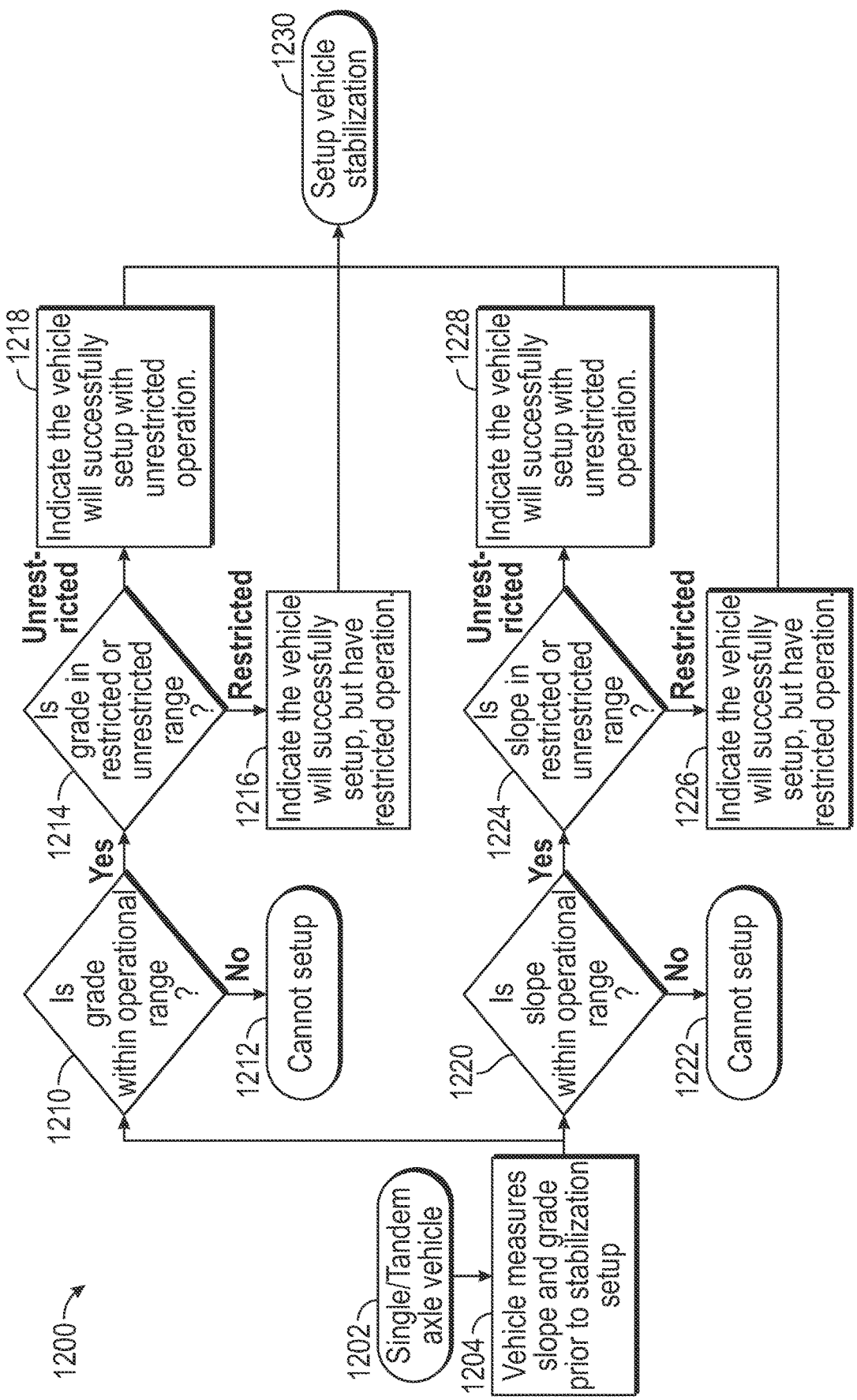
FIG. 12 is a method for providing an indication of operational capability of a fire apparatus, according to an exemplary embodiment.

Referring now to FIG. 12, a method 1200 for providing an indication of operational capability of a fire apparatus is shown according to an exemplary embodiment. In one example embodiment, method 1200 may be implemented with the level indication and control system 100, the tandem rear axle fire apparatus 2, and/or the single rear axle fire apparatus 4.

At step 1202, the controller 110 is configured to determine a type of a vehicle the controller 110 is installed in. By way of example, the controller 110 may be configured to determine whether the vehicle (e.g., the fire apparatus 10, etc.) is a tandem rear axle vehicle (e.g., the tandem rear axle fire apparatus 2, etc.) or a single rear axle vehicle (e.g., the single rear axle fire apparatus 4, etc.). The type of vehicle may be predefined within the controller 110 and/or input by an operator of the vehicle. The controller 110 may load various parameters and/or characteristics of the vehicle in response to determining the type of vehicle. By way of example, the parameters and/or characteristics of the vehicle may include wheelbase, axle track, weight, longitudinal length, lateral width, center of gravity, center of mass, performance characteristics of a stabilization system (e.g., the stabilization system 50; a maximum lateral extension distance, a maximum vertical extension distance, etc. of the outriggers 52, the downriggers 54, the stability foot 56; the number and/or placement of the outriggers 52, the downriggers 54, the stability foot 56; etc.), performance characteristics of an aerial ladder assembly (e.g., the aerial ladder assembly 70; maximum tip load, maximum horizontal reach, maximum vertical extension height, etc.; etc.), and/or still other parameters and/or characteristics of the vehicle. At step 1204, the controller 110 is configured to receive stability data including measurements of a grade (e.g., the grade 92, etc.) and/or a slope (e.g., the slope 94, etc.) of the vehicle from a sensor (e.g., the sensor system 130, the grade sensor 132, the slope sensor 134, etc.) after arriving at a site and stopping at a potential stabilization location for the vehicle.

At step 1210, the controller 110 is configured to determine whether the grade of the vehicle is within an operational grade range (e.g., a grade between the second negative grade threshold 322 and the second positive grade threshold 324, a grade within the unrestricted grade range 310 or the restricted grade range 320, etc.). At step 1212, the controller 110 is configured to provide an indication on a display (e.g., a display of the user interface 120, etc.) that the vehicle should not be set up and stabilized at the current location of the vehicle in response to the grade of the vehicle not being within the operational grade range (e.g., the grade is greater than the second positive grade threshold 324, the grade is greater than +10.8 degrees, the grade is less than the second negative grade threshold 322, the grade is less than −10.8 degrees, the grade is within the nonoperational grade range 330, etc.).

At step 1214, the controller 110 is configured to determine whether the grade of the vehicle is within an unrestricted grade range (e.g., the unrestricted grade range 310, between the first negative grade threshold 312 and the first positive grade threshold 314, between −9.8 degrees and +9.8 degrees, etc.) or within a restricted grade range (e.g., the restricted grade range 320, between the first negative grade threshold 312 and the second negative grade threshold 322, between the first positive grade threshold 314 and the second positive grade threshold 324, between −10.8 degrees and −9.8 degrees, between +9.8 degrees and +10.8 degrees, etc.) in response to the grade of the vehicle being within the operational grade range. At step 1216, the controller 110 is configured to provide an indication on the display that the vehicle is reconfigurable such that the vehicle is operable with at least partially restricted or limited operation in response to the grade being within the restricted grade range.

At step 1218, the controller 110 is configured to provide an indication on the display that the vehicle is reconfigurable such that the vehicle is operable with full, unrestricted operation in response to the grade being within the unrestricted grade range.

At step 1220, the controller 110 is configured to determine whether the slope of the vehicle is within an operational slope range (e.g., a slope between the second negative slope threshold 362 and the second positive slope threshold 364, a slope within the unrestricted slope range 350 or the restricted slope range 360, etc.). At step 1222, the controller 110 is configured to provide an indication on the display that the vehicle should not be set up and stabilized at the current location of the vehicle in response to the slope of the vehicle not being within the operational slope range (e.g., the slope is greater than the second positive slope threshold 364, the slope is greater than +15.9 degrees, the slope is less than the second negative slope threshold 362, the slope is less than −15.9 degrees, the slope is within the nonoperational slope range 370, etc.).

At step 1224, the controller 110 is configured to determine whether the slope of the vehicle is within an unrestricted slope range (e.g., the unrestricted slope range 350, between the first negative slope threshold 352 and the first positive slope threshold 354, between −13.8 degrees and +13.8 degrees, etc.) or within a restricted slope range (e.g., the restricted slope range 360, between the first negative slope threshold 352 and the second negative slope threshold 362, between the first positive slope threshold 354 and the second positive slope threshold 364, between −15.9 degrees and −13.8 degrees, between +13.8 degrees and +15.9 degrees, etc.) in response to the slope of the vehicle being within the operational slope range. At step 1226, the controller 110 is configured to provide an indication on the display that the vehicle is reconfigurable such that the vehicle is operable with at least partially restricted or limited operation in response to the slope being within the restricted slope range. At step 1228, the controller 110 is configured to provide an indication on the display that the vehicle is reconfigurable such that the vehicle is operable with full, unrestricted operation in response to the slope being within the unrestricted slope range.

At step 1230, the stabilization system (e.g., the outriggers 52, the downriggers 54, the stability foot 56, etc.) is set up to stabilize the vehicle for either restricted operation or unrestricted operation based on the determinations made at steps 1216, 1218, 1226, and/or 1228. In one embodiment, the stabilization system is manually activated and setup by an operator of the vehicle (e.g., manually activating the stabilization system 50 with buttons, levers, a touchscreen, etc. to extend the outriggers 52, the downriggers 54, the stability foot 56, etc.). In another embodiment, the controller 110 is configured to automatically setup the stabilization system (e.g., in response to an operator command or confirmation to initiate stabilization, etc.).

Figure 13A:
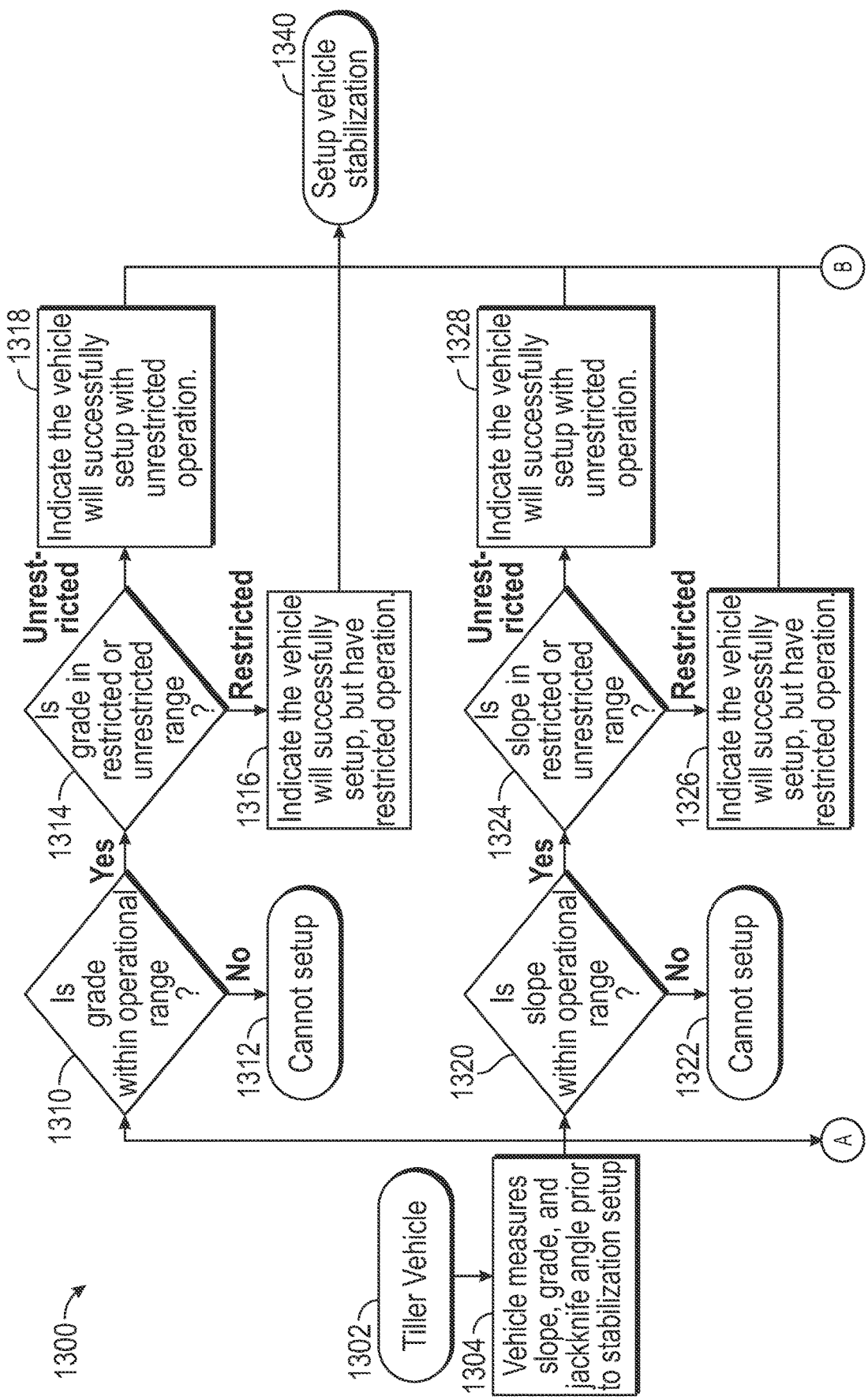
FIGS. 13A and 13B are a method for providing an indication of operational capability of a fire apparatus, according to another exemplary embodiment.
Figure 13B:
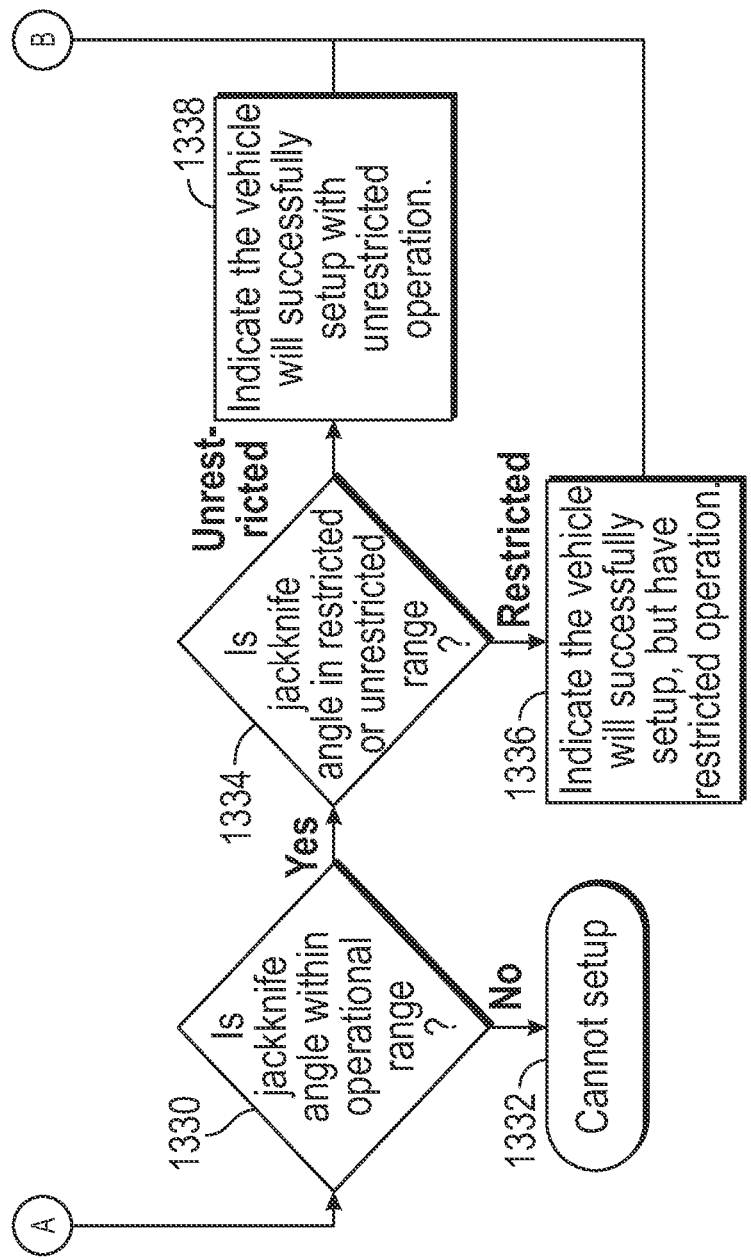

Referring now to FIGS. 13A and 13B, a method 1300 for providing an indication of operational capability of a fire apparatus is shown according to another exemplary embodiment. In one example embodiment, method 1300 may be implemented with the level indication and control system 100 and the tiller fire apparatus 6.

At step 1302, the controller 110 is configured to determine a type of a vehicle the controller 110 is installed in. By way of example, the controller 110 may be configured to determine whether the vehicle (e.g., the fire apparatus 10, etc.) is a tiller vehicle (e.g., the tiller fire apparatus 6, etc.). The type of vehicle may be predefined within the controller 110 and/or input by an operator of the vehicle. The controller 110 may load various parameters and/or characteristics of the vehicle in response to determining the type of vehicle. By way of example, the parameters and/or characteristics of the vehicle may include wheelbase, axle track, weight, longitudinal length, lateral width, center of gravity, center of mass, performance characteristics of a stabilization system (e.g., the stabilization system 50; a maximum lateral extension distance, a maximum vertical extension distance, etc. of the outriggers 52, the downriggers 54, the stability foot 56; the number and/or placement of the outriggers 52, the downriggers 54, the stability foot 56; etc.), performance characteristics of an aerial ladder assembly (e.g., the aerial ladder assembly 70; maximum tip load, maximum horizontal reach, maximum vertical extension height, etc.; etc.), and/or still other parameters and/or characteristics of the vehicle. At step 1304, the controller 110 is configured to receive stability data including measurements of a grade (e.g., the grade 92, etc.), a slope (e.g., the slope 94, etc.), and/or a jackknife angle (e.g., the jackknife angle 96, etc.) of the vehicle from a sensor (e.g., the sensor system 130, the grade sensor 132, the slope sensor 134, the jackknife sensor 136, etc.) after arriving at a site and stopping at a potential stabilization location for the vehicle.

At step 1310, the controller 110 is configured to determine whether the grade of the vehicle is within an operational grade range (e.g., a grade between the second negative grade threshold 422 and the second positive grade threshold 424, a grade within the unrestricted grade range 410 or the restricted grade range 420, etc.). At step 1312, the controller 110 is configured to provide an indication on a display (e.g., a display of the user interface 120, etc.) that the vehicle should not be set up and stabilized at the current location of the vehicle in response to the grade of the vehicle not being within the operational grade range (e.g., the grade is greater than the second positive grade threshold 424, the grade is greater than +4.5 degrees, the grade is less than the second negative grade threshold 422, the grade is less than −12.5 degrees, the grade is within the nonoperational grade range 430, etc.).

At step 1314, the controller 110 is configured to determine whether the grade of the vehicle is within an unrestricted grade range (e.g., the unrestricted grade range 410, between the first negative grade threshold 412 and the first positive grade threshold 414, between −12.5 degrees and +4.5 degrees, etc.) or within a restricted grade range (e.g., the restricted grade range 420, between the first negative grade threshold 412 and the second negative grade threshold 422, between the first positive grade threshold 414 and the second positive grade threshold 424, between −15.6 degrees and −12.5 degrees, between +4.5 degrees and +7.4 degrees, etc.) in response to the grade of the vehicle being within the operational grade range. At step 1316, the controller 110 is configured to provide an indication on the display that the vehicle is reconfigurable such that the vehicle is operable with at least partially restricted or limited operation in response to the grade being within the restricted grade range. At step 1318, the controller 110 is configured to provide an indication on the display that the vehicle is reconfigurable such that the vehicle is operable with full, unrestricted operation in response to the grade being within the unrestricted grade range.

At step 1320, the controller 110 is configured to determine whether the slope of the vehicle is within an operational slope range (e.g., a slope between the second negative slope threshold 462 and the second positive slope threshold 464, a slope within the unrestricted slope range 450 or the restricted slope range 460, etc.). At step 1322, the controller 110 is configured to provide an indication on the display that the vehicle should not be set up and stabilized at the current location of the vehicle in response to the slope of the vehicle not being within the operational slope range (e.g., the slope is greater than the second positive slope threshold 464, the slope is greater than +11.3 degrees, the slope is less than the second negative slope threshold 462, the slope is less than −11.3 degrees, the slope is within the nonoperational slope range 470, etc.).

At step 1324, the controller 110 is configured to determine whether the slope of the vehicle is within an unrestricted slope range (e.g., the unrestricted slope range 450, between the first negative slope threshold 452 and the first positive slope threshold 454, between −11.3 degrees and +11.3 degrees, etc.) or within a restricted slope range (e.g., the restricted slope range 460, between the first negative slope threshold 452 and the second negative slope threshold 462, between the first positive slope threshold 454 and the second positive slope threshold 464, between −14.4 degrees and −11.3 degrees, between +11.3 degrees and +14.4 degrees, etc.) in response to the slope of the vehicle being within the operational slope range. At step 1326, the controller 110 is configured to provide an indication on the display that the vehicle is reconfigurable such that the vehicle is operable with at least partially restricted or limited operation in response to the slope being within the restricted slope range. At step 1328, the controller 110 is configured to provide an indication on the display that the vehicle is reconfigurable such that the vehicle is operable with full, unrestricted operation in response to the slope being within the unrestricted slope range.

At step 1330, the controller 110 is configured to determine whether the jackknife angle of the vehicle is within an operational jackknife angle range (e.g., a jackknife angle between the second negative jackknife angle threshold 502 and the second positive jackknife angle threshold 504, a jackknife angle within the unrestricted jackknife angle range 490 or the restricted jackknife angle range 500, etc.). At step 1332, the controller 110 is configured to provide an indication on the display that the vehicle should not be set up and stabilized at the current location of the vehicle in response to the jackknife angle of the vehicle not being within the operational jackknife angle range (e.g., the jackknife angle is greater than the second positive jackknife angle threshold 504, the jackknife angle is greater than +60 degrees, the jackknife angle is less than the second negative jackknife angle threshold 502, the jackknife angle is less than −60 degrees, the jackknife angle is within the nonoperational jackknife angle range 510, etc.).

At step 1334, the controller 110 is configured to determine whether the jackknife angle of the vehicle is within an unrestricted jackknife angle range (e.g., the unrestricted jackknife angle range 490, between the first negative jackknife angle threshold 492 and the first positive jackknife angle threshold 494, between −30 degrees and +30 degrees, etc.) or within a restricted jackknife angle range (e.g., the restricted jackknife angle range 500, between the first negative jackknife angle threshold 492 and the second negative jackknife angle threshold 502, between the first positive jackknife angle threshold 494 and the second positive jackknife angle threshold 504, between −60 degrees and −30 degrees, between +30 degrees and +60 degrees, etc.) in response to the jackknife angle of the vehicle being within the operational jackknife angle range. At step 1336, the controller 110 is configured to provide an indication on the display that the vehicle is reconfigurable such that the vehicle is operable with at least partially restricted or limited operation in response to the jackknife angle being within the restricted jackknife angle range. At step 1338, the controller 110 is configured to provide an indication on the display that the vehicle is reconfigurable such that the vehicle is operable with full, unrestricted operation in response to the jackknife angle being within the unrestricted jackknife angle range.

At step 1340, the stabilization system (e.g., the outriggers 52, the downriggers 54, the stability foot 56, etc.) is set up to stabilize the vehicle for either restricted operation or unrestricted operation based on the determinations made at steps 1316, 1318, 1326, 1328, 1336, and/or 1338. In one embodiment, the stabilization system is manually activated and setup by an operator of the vehicle (e.g., manually activating the stabilization system 50 with buttons, levers, a touchscreen, etc. to extend the outriggers 52, the downriggers 54, the stability foot 56, etc.). In another embodiment, the controller 110 is configured to automatically setup the stabilization system (e.g., in response to an operator command or confirmation to initiate stabilization, etc.).

Figure 14A:
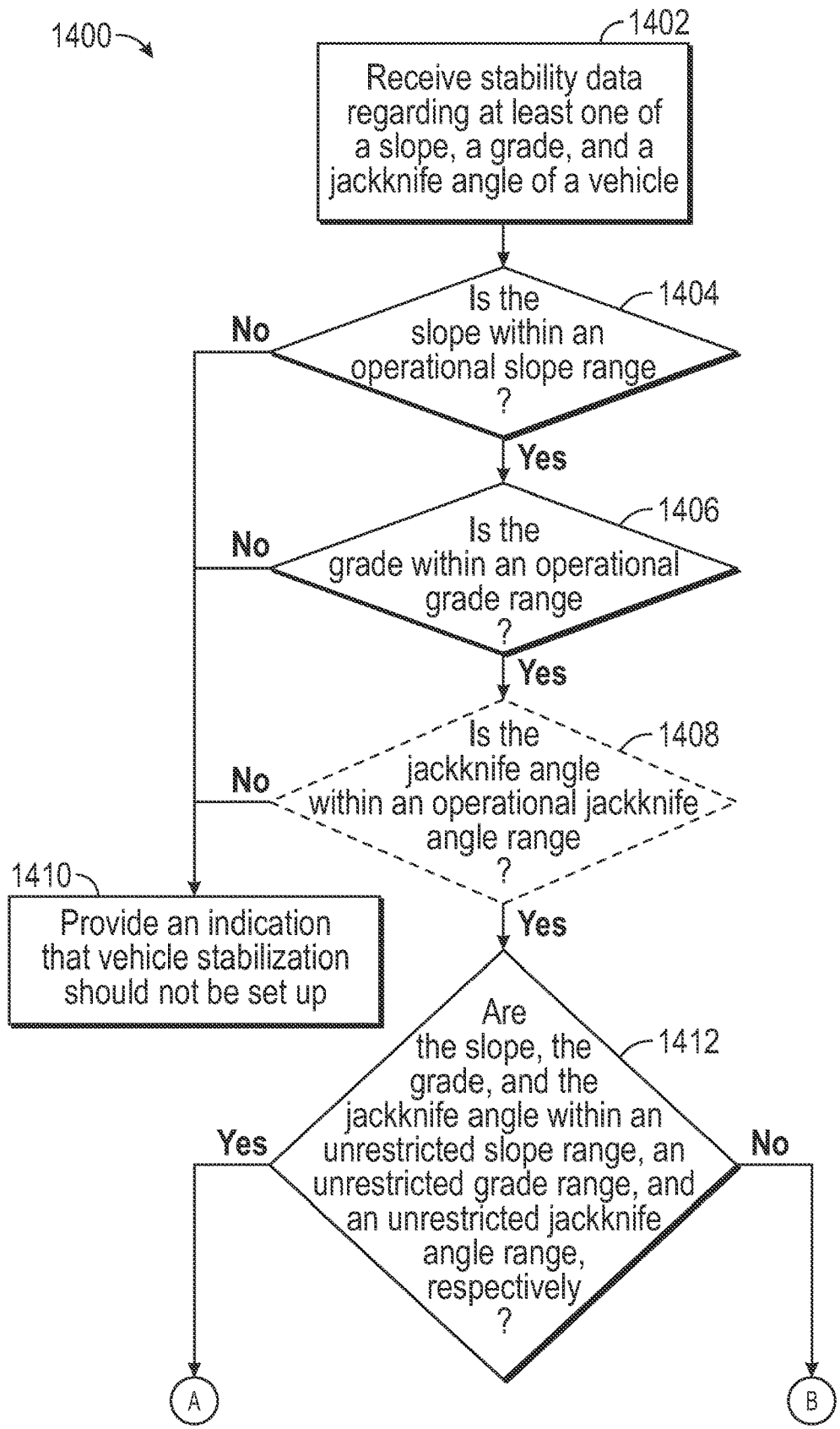
FIGS. 14A and 14B are a method for providing an indication of operational capability of a fire apparatus, according to still another exemplary embodiment.
Figure 14B:
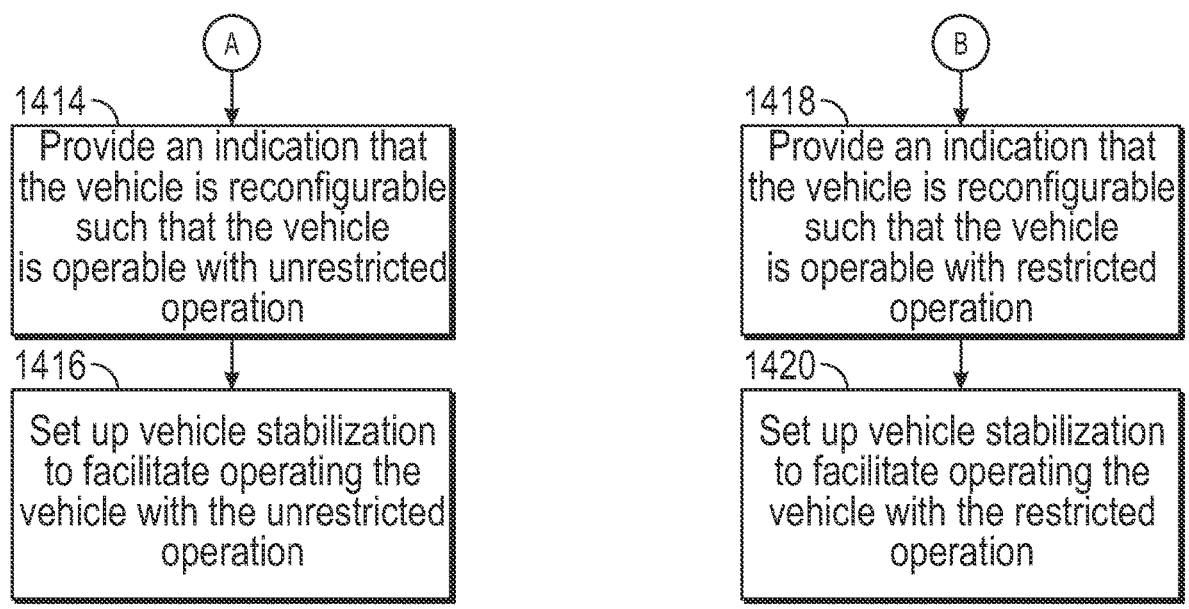

Referring now to FIGS. 14A and 14B, a method 1400 for providing an indication of operational capability of a fire apparatus is shown according to still another exemplary embodiment. In one example embodiment, method 1400 may be implemented with the level indication and control system 100, the tandem rear axle fire apparatus 2, the single rear axle fire apparatus 4, and/or the tiller fire apparatus 6.

At step 1402, the controller 110 is configured to receive stability data from a sensor (e.g., the sensor system 130, the grade sensor 132, the slope sensor 134, the jackknife sensor 136, etc.) regarding at least one of a grade (e.g., the grade 92, etc.), a slope (e.g., the slope 94, etc.), and a jackknife angle (e.g., the jackknife angle 96, etc.) of a vehicle (e.g., the fire apparatus 10, the tandem rear axle fire apparatus 2, the single rear axle fire apparatus 4, the tiller fire apparatus 6, etc.). At step 1404, the controller 110 is configured to determine whether the slope of the vehicle is within an operational slope range (e.g., a slope within the unrestricted slope range 350, the unrestricted slope range 450, the restricted slope range 360, the restricted slope range 460, etc.). At step 1406, the controller 110 is configured to determine whether the grade of the vehicle is within an operational grade range (e.g., a grade within the unrestricted grade range 310, the unrestricted grade range 410, the restricted grade range 320, the restricted grade range 420, etc.) in response to the slope being within the operational slope range. At step 1408, the controller 110 is configured to optionally determine (e.g., only for vehicles having a trailer or tractor such as tiller fire apparatus 6, etc.) whether the jackknife angle of the vehicle is within an operational jackknife angle range (e.g., a jackknife angle within the unrestricted jackknife angle range 490, the restricted jackknife angle range 500, etc.) in response to the slope and the grade being within the operational slope range and the operational grade range, respectively. At step 1410, the controller 110 is configured to provide an indication on a display (e.g., the user interface 120, etc.) that the vehicle should not be set up and stabilized at the current location of the vehicle in response to at least one of (i) the slope of the vehicle not being within the operational slope range (e.g., the slope is within the nonoperational slope range 370, the nonoperational slope range 470, etc.), (ii) the grade of the vehicle not being within the operational grade range (e.g., the grade is within the nonoperational grade range 330, the nonoperational grade range 430, etc.), and (iii) the jackknife angle of the vehicle not being within the operational jackknife angle range (e.g., the jackknife angle is within the nonoperational jackknife angle range 510, etc.).

At step 1412, the controller 110 is configured to determine (i) whether the slope of the vehicle is within an unrestricted slope range (e.g., the unrestricted slope range 350, the unrestricted slope range 450, etc.) or within a restricted slope range (e.g., the restricted slope range 360, the restricted slope range 460, etc.), (ii) whether the grade of the vehicle is within an unrestricted grade range (e.g., the unrestricted grade range 310, the unrestricted grade range 410, etc.) or within a restricted grade range (e.g., the restricted grade range 320, the restricted grade range 420, etc.), and optionally (e.g., only if step 1408 is performed, etc.) (iii) whether the jackknife angle of the vehicle is within an unrestricted jackknife angle range (e.g., the unrestricted jackknife angle range 490, etc.) or within a restricted jackknife angle range (e.g., the restricted jackknife angle range 500, etc.) in response to the slope, the grade, and the jackknife angle of the vehicle being within the operational slope range, the operational grade range, and the operational jackknife angle range, respectively.

At step 1414, the controller 110 is configured to provide an indication on the display that the vehicle (e.g., the stabilization system 50, etc.) is reconfigurable such that the vehicle is operable with unrestricted operation (i.e., full operation) in response to the slope, the grade, and the jackknife angle being within the unrestricted slope range, the unrestricted grade range, and the unrestricted jackknife angle range, respectively. At step 1416, a stabilization system (e.g., the stabilization system 50, the outriggers 52, the downriggers 54, the stability foot 56, etc.) is set up to stabilize the vehicle for unrestricted operation. In one embodiment, the stabilization system is manually activated and setup by an operator of the vehicle (e.g., manually activating the stabilization system 50 with buttons, levers, a touchscreen, etc. to extend the outriggers 52, the downriggers 54, the stability foot 56, etc.). In another embodiment, the controller 110 is configured to automatically setup the stabilization system (e.g., in response to an operator command or confirmation to initiate stabilization, etc.).

At step 1418, the controller 110 is configured to provide an indication on the display that the vehicle (e.g., the stabilization system 50, etc.) is reconfigurable such that the vehicle is operable with at least partially restricted or limited operation (i.e., partial operation) in response to at least one of the slope, the grade, and the jackknife angle being within the restricted slope range, the restricted grade range, and the restricted jackknife angle range, respectively. At step 1420, the stabilization system is set up to stabilize the vehicle for restricted operation. In some embodiments, the level of restriction in operation of the vehicle is based on which of, how many of, and how severe the slope, the grade, and/or the jackknife angle exceed the unrestricted slope range, the unrestricted grade range, and/or the unrestricted jackknife angle range.

Figure 15A:
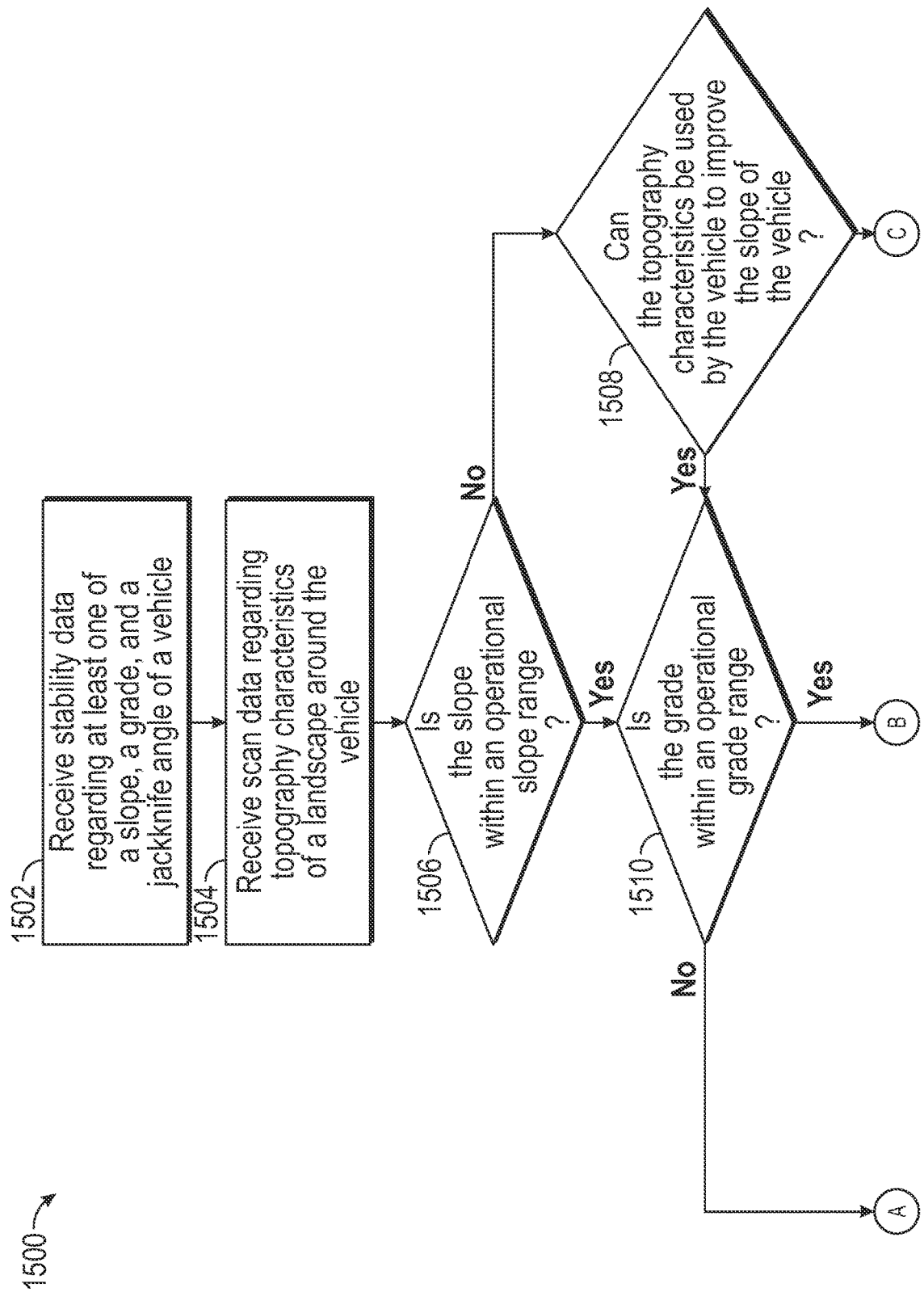
FIGS. 15A-15C are a method for providing an indication of operational capability of a fire apparatus, according to yet another exemplary embodiment.
Figure 15B:
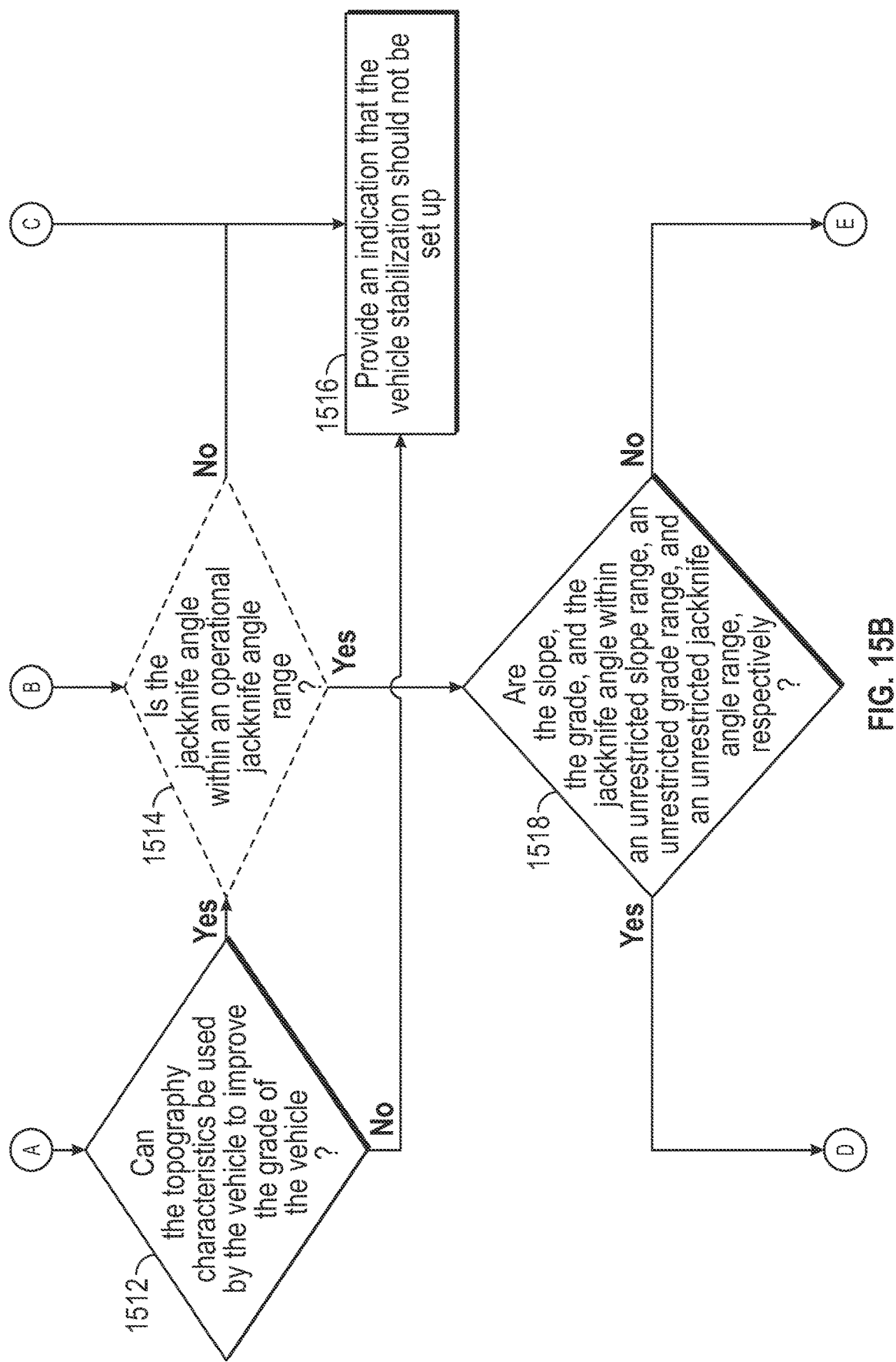
Figure 15C:
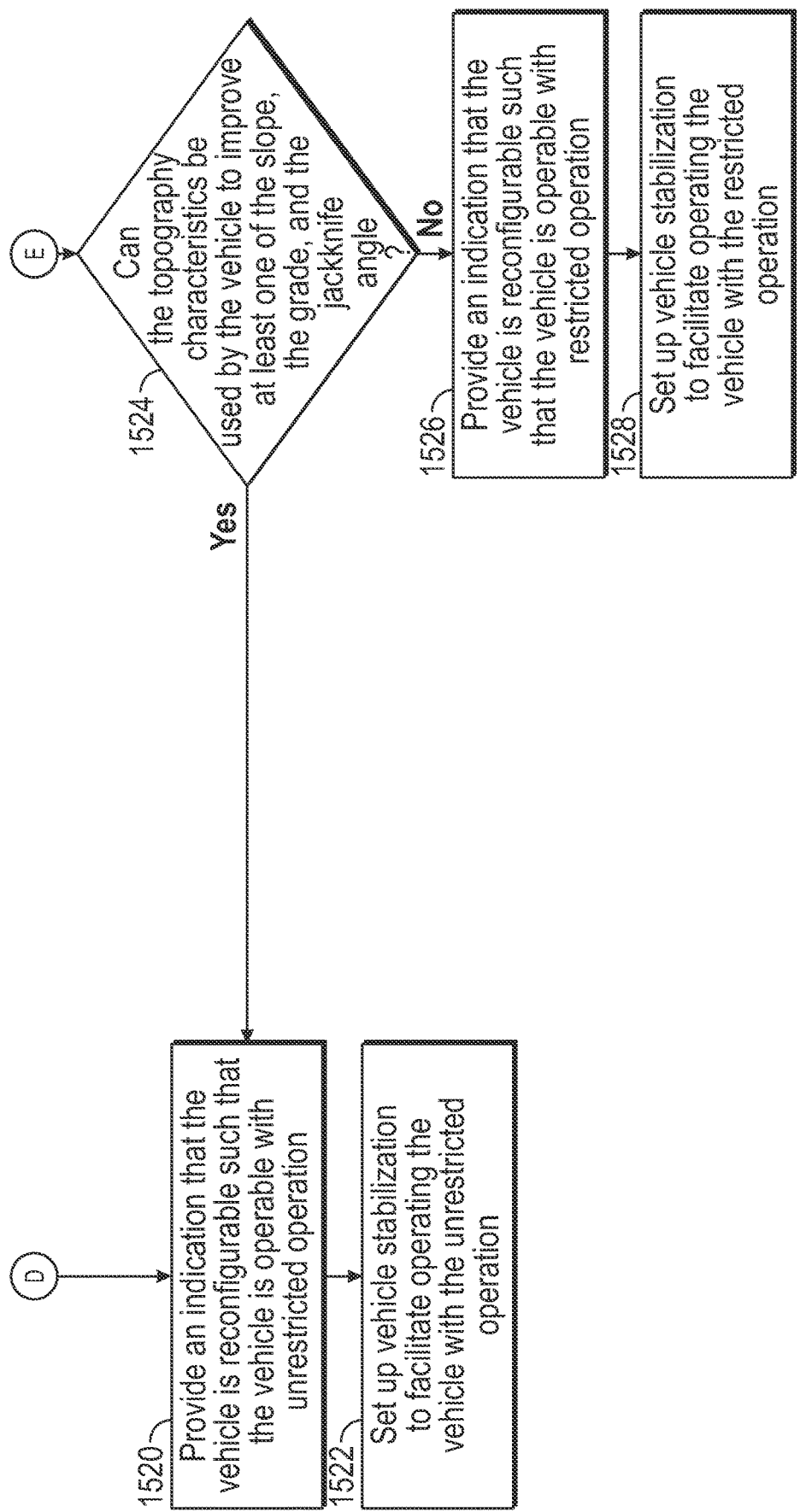

Referring now to FIGS. 15A-15C, a method 1500 for providing an indication of operational capability of a fire apparatus is shown according to yet another exemplary embodiment. In one example embodiment, method 1500 may be implemented with the level indication and control system 100, the tandem rear axle fire apparatus 2, the single rear axle fire apparatus 4, and/or the tiller fire apparatus 6.

At step 1502, the controller 110 is configured to receive stability data from a sensor (e.g., the sensor system 130, the grade sensor 132, the slope sensor 134, the jackknife sensor 136, etc.) the regarding at least one of a grade (e.g., the grade 92, etc.), a slope (e.g., the slope 94, etc.), and a jackknife angle (e.g., the jackknife angle 96, etc.) of a vehicle (e.g., the fire apparatus 10, the tandem rear axle fire apparatus 2, the single rear axle fire apparatus 4, the tiller fire apparatus 6, etc.). At step 1504, the controller 110 is configured to receive scan data from scanner (e.g. the topography scanner 140, etc.) regarding topography characteristics of a landscape around the vehicle (e.g., curbs, mounds, divots, potholes, boulders, etc.).

At step 1506, the controller 110 is configured to determine whether the slope of the vehicle is within an operational slope range (e.g., a slope within the unrestricted slope range 350, the unrestricted slope range 450, the restricted slope range 360, the restricted slope range 460, etc.). At step 1508, the controller 110 is configured to determine whether the topography characteristics around the vehicle may be used by the vehicle (e.g., the stabilization system 50, etc.) to improve the slope of the vehicle such that the slope may be within the operational slope range in response to the slope not being within the operational slope range. If the slope is within or can be improved to be within the operational slope range, the controller 110 proceeds to step 1510.

At step 1510, the controller 110 is configured to determine whether the grade of the vehicle is within an operational grade range (e.g., a grade within the unrestricted grade range 310, the unrestricted grade range 410, the restricted grade range 320, the restricted grade range 420, etc.) in response to the slope being within or being able to be improved to be within the operational slope range. At step 1512, the controller 110 is configured to determine whether the topography characteristics around the vehicle may be used by the vehicle (e.g., the stabilization system 50, etc.) to improve the grade of the vehicle such that the grade may be within the operational slope range in response to the grade not being within the operational slope range. If the grade is within or can be improved to be within the operational grade range, the controller 110 proceeds to step 1514.

At step 1514, the controller 110 is configured to optionally determine (e.g., only for vehicles having a trailer or tractor such as tiller fire apparatus 6, etc.) whether the jackknife angle of the vehicle is within an operational jackknife angle range (e.g., a jackknife angle within the unrestricted jackknife angle range 490, the restricted jackknife angle range 500, etc.) in response to the slope and the grade being within or being able to be improved to be within the operational slope range and the operational grade range, respectively. At step 1516, the controller 110 is configured to provide an indication on a display (e.g., the user interface 120, etc.) that the vehicle should not be set up and stabilized at the current location of the vehicle in response to at least one of (i) the slope of the vehicle not being within or being able to be improved to be within the operational slope range (e.g., the slope is within the nonoperational slope range 370, the nonoperational slope range 470, etc.), (ii) the grade of the vehicle not being within or being able to be improved to be within the operational grade range (e.g., the grade is within the nonoperational grade range 330, the nonoperational grade range 430, etc.), and (iii) the jackknife angle of the vehicle not being within the operational jackknife angle range (e.g., the jackknife angle is within the nonoperational jackknife angle range 510, etc.).

At step 1518, the controller 110 is configured to determine (i) whether the slope of the vehicle is within an unrestricted slope range (e.g., the unrestricted slope range 350, the unrestricted slope range 450, etc.) or within a restricted slope range (e.g., the restricted slope range 360, the restricted slope range 460, etc.), (ii) whether the grade of the vehicle is within an unrestricted grade range (e.g., the unrestricted grade range 310, the unrestricted grade range 410, etc.) or within a restricted grade range (e.g., the restricted grade range 320, the restricted grade range 420, etc.), and optionally (e.g., only if step 1514 is performed, etc.) (iii) whether the jackknife angle of the vehicle is within an unrestricted jackknife angle range (e.g., the unrestricted jackknife angle range 490, etc.) or within a restricted jackknife angle range (e.g., the restricted jackknife angle range 500, etc.) in response to the slope, the grade, and the jackknife angle of the vehicle being within or being able to be improved to be within the operational slope range, the operational grade range, and the operational jackknife angle range, respectively.

At step 1520, the controller 110 is configured to provide an indication on the display that the vehicle (e.g., the stabilization system 50, etc.) is reconfigurable such that the vehicle is operable with unrestricted operation (i.e., full operation) in response to the slope, the grade, and the jackknife angle being within the unrestricted slope range, the unrestricted grade range, and the unrestricted jackknife angle range, respectively. At step 1522, a stabilization system (e.g., the stabilization system 50, the outriggers 52, the downriggers 54, the stability foot 56, etc.) is set up to stabilize the vehicle for unrestricted operation. In one embodiment, the stabilization system is manually activated and setup by an operator of the vehicle (e.g., manually activating the stabilization system 50 with buttons, levers, a touchscreen, etc. to extend the outriggers 52, the downriggers 54, the stability foot 56, etc.). In another embodiment, the controller 110 is configured to automatically setup the stabilization system (e.g., in response to an operator command or confirmation to initiate stabilization, etc.).

At step 1524, the controller 110 is configured to determine whether the topography characteristics around the vehicle may be used by the vehicle (e.g., the stabilization system 50, etc.) to improve whichever of the grade and the slope of the vehicle needs to be improved such that the grade, the slope, and the jackknife angle are within the unrestricted grade range, the unrestricted slope range, and the unrestricted jackknife angle, respectively, in response to at least one of the grade, the slope, and the jackknife angle being within the restricted grade range, the restricted slope range, and the restricted jackknife angle range, respectively. If the grade, the slope, and the jackknife angle are within or can be improved to be within the unrestricted grade range, the unrestricted slope range, and the unrestricted jackknife angle range, the controller 110 proceeds to step 1520.

At step 1526, the controller 110 is configured to provide an indication on the display that the vehicle (e.g., the stabilization system 50, etc.) is reconfigurable such that the vehicle is operable with at least partially restricted or limited operation (i.e., partial operation) in response to at least one of the slope, the grade, and the jackknife angle being within and not being able to be improved to not be in the restricted slope range, the restricted grade range, and the restricted jackknife angle range, respectively. At step 1528, the stabilization system is set up to stabilize the vehicle for restricted operation. In some embodiments, the level of restriction in operation of the vehicle is based on which of, how many of, and how severe the slope, the grade, and/or the jackknife angle exceed the unrestricted slope range, the unrestricted grade range, and/or the unrestricted jackknife angle range.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claim.

The invention claimed is:

1. A level indication system for a vehicle, the level indication system comprising:
    a control system configured to:
        determine whether a stability characteristic of the vehicle at a current location is within an operational range or a nonoperational range, the stability characteristic including at least one of a slope, a grade, or a jackknife angle of the vehicle;
        provide (i) a first indication that the vehicle is reconfigurable at the current location into a state whereby the vehicle is operable at the current location in response to determining that the stability characteristic is within the operational range or (ii) a second indication that the vehicle is not operable at the current location in response to determining that the stability characteristic is within the nonoperational range; and
        facilitate engaging a stabilization system of the vehicle in response to the stability characteristic being within the operational range and thereby reconfiguring the vehicle into a state whereby the vehicle is operable at the current location.

2. The level indication system of claim 1, wherein the stability characteristic includes the slope and the grade of the vehicle.

3. The level indication system of claim 1, wherein the stability characteristic includes the slope, the grade, and the jackknife angle of the vehicle.

4. The level indication system of claim 1, wherein the operational range includes an unrestricted range and a restricted range.

5. The level indication system of claim 4, further comprising a topography scanner positioned to acquire scan data regarding a topography characteristic of an area around the vehicle at the current location.

6. The level indication system of claim 5, wherein the control system is configured to determine whether the topography characteristic can be used by the stabilization system to at least one of:
    improve the stability characteristic from the nonoperational range to the operational range; or
    improve the stability characteristic from the restricted range to the unrestricted range.

7. The level indication system of claim 4, wherein the control system is configured to:
    facilitate unrestricted operation of at least one component of the vehicle in response to the stability characteristic being within the unrestricted range;
    partially restrict operation of the at least one component of the vehicle in response to the stability characteristic being within the restricted range; and
    prevent operation of the at least one component of the vehicle in response to the stability characteristic being within the nonoperational range.

8. The level indication system of claim 7, wherein the at least one component of the vehicle includes an aerial ladder assembly.

9. A level indication system for a vehicle, the level indication system comprising:
    a control system configured to:
        acquire stability data regarding at least one of a slope, a grade, or a jackknife angle of the vehicle at a current location;
        determine whether the at least one of the slope, the grade, or the jackknife angle is within an operational slope range, an operational grade range, or an operational jackknife angle range, respectively;
        provide a first indication that the vehicle is reconfigurable at the current location into an operable state in response to determining that the at least one of the slope, the grade, or the jackknife angle is within the operational slope range, the operational grade range, or the operational jackknife angle range, respectively; and
        provide a second indication that the vehicle is not reconfigurable at the current location into the operable state in response to determining that the at least one of the slope, the grade, or the jackknife angle is within a nonoperational slope range, a nonoperational grade range, or a nonoperational jackknife angle range, respectively.

10. The level indication system of claim 9, wherein the stability data includes data regarding at least two of the slope, the grade, or the jackknife angle.

11. The level indication system of claim 9, wherein the control system is configured to activate a stabilization system of the vehicle to reconfigure the vehicle into the operable state in response to receiving a command from an operator to activate the stabilization system.

12. The level indication system of claim 9, wherein the control system is configured to automatically activate a stabilization system of the vehicle to reconfigure the vehicle into the operable state in response to determining that the vehicle is reconfigurable into the operable state at the current location.

13. The level indication system of claim 9, wherein the operational slope range includes an unrestricted slope range and a restricted slope range, the operational grade range includes an unrestricted grade range and a restricted grade range, and the operational jackknife angle range includes an unrestricted jackknife range and a restricted jackknife range.

14. The level indication system of claim 13, wherein the first indication indicates (i) that the vehicle is operable with unrestricted operation at the current location in response to the at least one of the slope, the grade, or the jackknife angle being within the unrestricted slope range, the unrestricted grade range, or the unrestricted jackknife range, respectively, or (ii) that the vehicle is operable with restricted operation at the current location in response to the at least one of the slope, the grade, or the jackknife angle being within the restricted slope range, the restricted grade range, or the restricted jackknife range, respectively.

15. The level indication system of claim 13, wherein the control system is configured to:
receive topography data regarding a topography characteristic of an area around the vehicle at the current location; and
determine whether the topography characteristic can be used by a stabilization system to at least one of:
improve at least one of the slope or the grade from the nonoperational slope range or the nonoperational grade range, respectively, to the operational slope range or the operational grade range, respectively; or
improve the at least one of the slope or the grade from the restricted slope range or the restricted grade range, respectively, to the unrestricted slope range or the unrestricted grade range, respectively.

16. A leveling system for a vehicle, the leveling system comprising:
a control system configured to:
acquire stability data regarding a stability characteristic of the vehicle at a current location;
determine whether the stability characteristic is within an operational range;
provide a first indication that the vehicle is reconfigurable at the current location into an operable state in response to determining that the stability characteristic is within the operational range; and
provide a second indication that the vehicle is not reconfigurable at the current location into the operable state in response to determining that the stability characteristic is within a nonoperational range.

17. The leveling system of claim 16, wherein the operational range includes an unrestricted range and a restricted range.

18. The leveling system of claim 17, wherein the control system is configured to:
receive topography data regarding a topography characteristic of an area around the vehicle at the current location; and
determine whether the topography characteristic can be used by a stabilization system to at least one of:
improve the stability characteristic from the nonoperational range to the operational range; or
improve the stability characteristic from the restricted range to the unrestricted range.

19. The leveling indication system of claim 17, wherein the first indication indicates that (i) the vehicle is operable with unrestricted operation at the current location in response to the stability characteristic being within the unrestricted range or (ii) that the vehicle is operable with restricted operation at the current location in response to the stability characteristic being within the restricted range.

20. The leveling system of claim 16, wherein the control system is configured to activate a stabilization system of the vehicle to reconfigure the vehicle into the operable state in response to receiving a command from an operator to activate the stabilization system, or wherein the control system is configured to automatically activate the stabilization system of the vehicle to reconfigure the vehicle into the operable state in response to determining that the vehicle is reconfigurable into the operable state at the current location.

* * * * *